(12) United States Patent
Hirabayashi et al.

(10) Patent No.: US 8,521,003 B2
(45) Date of Patent: Aug. 27, 2013

(54) RECORDING APPARATUS AND RECORDING MEDIUM

(75) Inventors: Mitsuhiro Hirabayashi, Tokyo (JP); Makoto Yamada, Tokyo (JP); Toshihiro Ishizaka, Kanagawa (JP); Satoshi Tsujii, Tokyo (JP)

(73) Assignee: Sony Corporation, Tokyo (JP)

( * ) Notice: Subject to any disclaimer, the term of this patent is extended or adjusted under 35 U.S.C. 154(b) by 1543 days.

(21) Appl. No.: 12/080,446

(22) Filed: Apr. 3, 2008

(65) Prior Publication Data

US 2008/0193097 A1    Aug. 14, 2008

Related U.S. Application Data

(62) Division of application No. 10/221,470, filed on Sep. 12, 2002, now Pat. No. 7,853,116.

(30) Foreign Application Priority Data

Jan. 15, 2001 (JP) ................................. 2001-006210
Feb. 16, 2001 (JP) ................................. 2001-040717

(51) Int. Cl.
*H04N 9/80* (2006.01)

(52) U.S. Cl.
USPC ........................................................ 386/248

(58) Field of Classification Search
USPC ........................................................ 386/248
See application file for complete search history.

(56) References Cited

U.S. PATENT DOCUMENTS

| 5,956,729 | A | 9/1999 | Goetz et al. |
| 6,173,113 | B1 | 1/2001 | Okada et al. |
| 6,795,383 | B1 * | 9/2004 | Yamamoto et al. ........ 369/47.16 |
| 2004/0205224 | A1 * | 10/2004 | Jones et al. .................. 709/231 |

FOREIGN PATENT DOCUMENTS

| EP | 0 424 903 | 5/1991 |
| EP | 0 905 699 | 3/1999 |
| EP | 0 929 072 | 7/1999 |
| EP | 1 030 307 | 8/2000 |

(Continued)

OTHER PUBLICATIONS

David Singer: "Quick time file format specification, May 1996" SPECDOC, Jan. 20, 1998, pp. I-In-6, XP007901171.

*Primary Examiner* — Gelek W Topgyal
(74) *Attorney, Agent, or Firm* — Frommer Lawrence & Haug LLP; William S. Frommer; Ellen Marcie Emas

(57) ABSTRACT

The present invention relates to a recording apparatus and a record medium for recording a data read time, a seek time, a successive reproduction time, a successive record length, and a correlation among data pieces. A recording apparatus of the present invention is a recoding apparatus for recording data to a rewritable record medium, comprising an encoding means for encoding the data corresponding to a predetermined compressing and encoding system, a converting means for converting a data structure of encoded data that is output from the encoding means into a file structure that a computer software program that synchronously reproduces a moving picture and so forth can handle without need to use a special hardware device, and a recording means for recording data having the file structure to the record medium, wherein the file structure has a first data unit, a second data unit, and a data portion, the second data unit being a set of a plurality of first data units, the data portion describing management information, wherein the plurality of second data units is correlated with a successive record length of the record medium, and wherein the data portion contains a time length and a data length of the second data unit recorded in the successive record length.

8 Claims, 34 Drawing Sheets

(56) References Cited

FOREIGN PATENT DOCUMENTS

| | | |
|---|---|---|
| EP | 1 089 572 | 4/2001 |
| JP | 10-51738 | 2/1998 |
| JP | 11-38954 | 2/1999 |
| JP | 2000-224523 | 8/2000 |
| JP | 2000 306327 | 11/2000 |
| JP | 2001-101790 | 4/2001 |
| WO | WO 99 37072 | 7/1999 |
| WO | WO 00 30112 | 5/2000 |

* cited by examiner

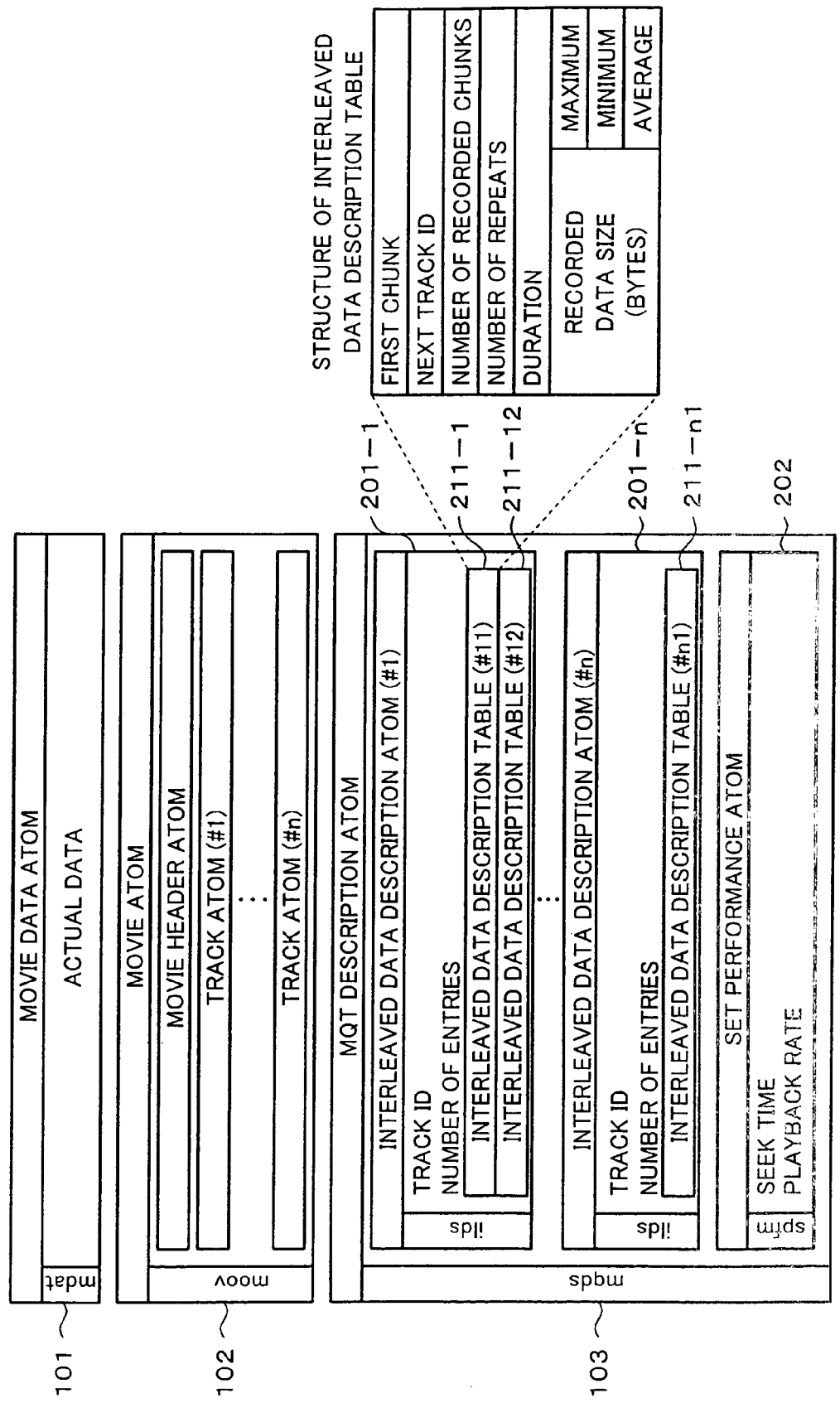

Fig. 5

| ATOM AND FIELD | SIZE (BYTES) |
|---|---|
| MQT descriptor atom{ | |
|     atom size | 4 |
|     atom type = 'mqds' | 4 |
|     version | 1 |
|     flag | 2 |
|     interleaved data description atom{ | |
|         atom size | 4 |
|         atom type = 'ilds' | 4 |
|         version | 1 |
|         flag | 2 |
|         track ID | 4 |
|         number of entries | 4 |
|         interleaved data description table{ | |
|             first chunk | 4 |
|             next track ID | 4 |
|             number of recorded chunks | 2 |
|             number of repeat | 1 |
|             duration | 4 |
|             max recorded data size | 4 |
|             min recorded data size | 4 |
|             average recorded data size | 4 |
|             reserved | 1 |
|         } | |
|     } | |
|     set performance atom{ | |
|         atom size | 4 |
|         atom type = 'spfm' | 4 |
|         version | 1 |
|         flag | 2 |
|         seek time | 2 |
|         playback rate | 2 |
|     } | |
| } | |

Fig. 6

| ATOM AND FIELD | SIZE (BYTES) |
|---|---|
| MQT descriptor atom{ | |
|     atom size | 4 |
|     atom type = 'mqds' | 4 |
|     version | 1 |
|     flag | 2 |
|     interleaved data description atom{ | |
|         atom size | 4 |
|         atom type = 'ilds' | 4 |
|         version | 1 |
|         flag | 2 |
|         track ID | 4 |
|         duration | 4 |
|         max recorded data size | 4 |
|         min recorded data size | 4 |
|         average recorded data size | 4 |
|         number of entries | 4 |
|             interleaved data description table{ | |
|             first chunk | 4 |
|             next track ID | 4 |
|             number of recorded chunks | 2 |
|             number of repeat | 1 |
|             reserved | 1 |
|         } | |
|     } | |
|     set performance atom{ | |
|         atom size | 4 |
|         atom type = 'spfm' | 4 |
|         version | 1 |
|         flag | 2 |
|         seek time | 2 |
|         playback rate | 2 |
|     } | |
| } | |

INTERLEAVED DATA DESCRIPTION TABLE

| FIELD | TABLE #1 AUDIO TRACK A | TABLE #1 AUDIO TRACK B | TABLE #1 VIDEO TRACK |
|---|---|---|---|
| FIRST CHUNK | 1 | 1 | 1 |
| NEXT TRACK ID | 3 | 1 | 0 |
| NUMBER OF RECORDED CHUNKS | 2 | 4 | 1 |
| NUMBER OF REPEATS | 1 | 1 | 1 |
| DURATION | n | n | n |
| MAXIMUM RECORDED DATA SIZE | a | c | b |
| MINIMUM RECORDED DATA SIZE | a | c | b |
| AVERAGE RECORDED DATA SIZE | a | c | b |

Fig. 9A

INTERLEAVED DATA DESCRIPTION TABLE

| FIELD | TABLE #1 AUDIO TRACK | TABLE #1 VIDEO TRACK |
|---|---|---|
| FIRST CHUNK | 1 | 1 |
| NEXT TRACK ID | 2 | 0 |
| NUMBER OF RECORDED CHUNKS | 2 | 1 |
| NUMBER OF REPEATS | 2 | 2 |
| DURATION | n | n |
| MAXIMUM RECORDED DATA SIZE | a | b |
| MINIMUM RECORDED DATA SIZE | a | b |
| AVERAGE RECORDED DATA SIZE | a | b |

Fig. 9B

| FIELD | TABLE #2 AUDIO TRACK |
|---|---|
| FIRST CHUNK | k |
| NEXT TRACK ID | 2 |
| NUMBER OF RECORDED CHUNKS | 1 |
| NUMBER OF REPEATS | 2 |
| DURATION | n |
| MAXIMUM RECORDED DATA SIZE | a |
| MINIMUM RECORDED DATA SIZE | a |
| AVERAGE RECORDED DATA SIZE | a |

| FIELD | TABLE #3 AUDIO TRACK | TABLE #2 VIDEO TRACK |
|---|---|---|
| FIRST CHUNK | m | j |
| NEXT TRACK ID | 0 | 1 |
| NUMBER OF RECORDED CHUNKS | 2 | 2 |
| NUMBER OF REPEATS | 1 | 1 |
| DURATION | 2n | 2n |
| MAXIMUM RECORDED DATA SIZE | 2a | 2b |
| MINIMUM RECORDED DATA SIZE | 2a | 2b |
| AVERAGE RECORDED DATA SIZE | 2a | 2b |

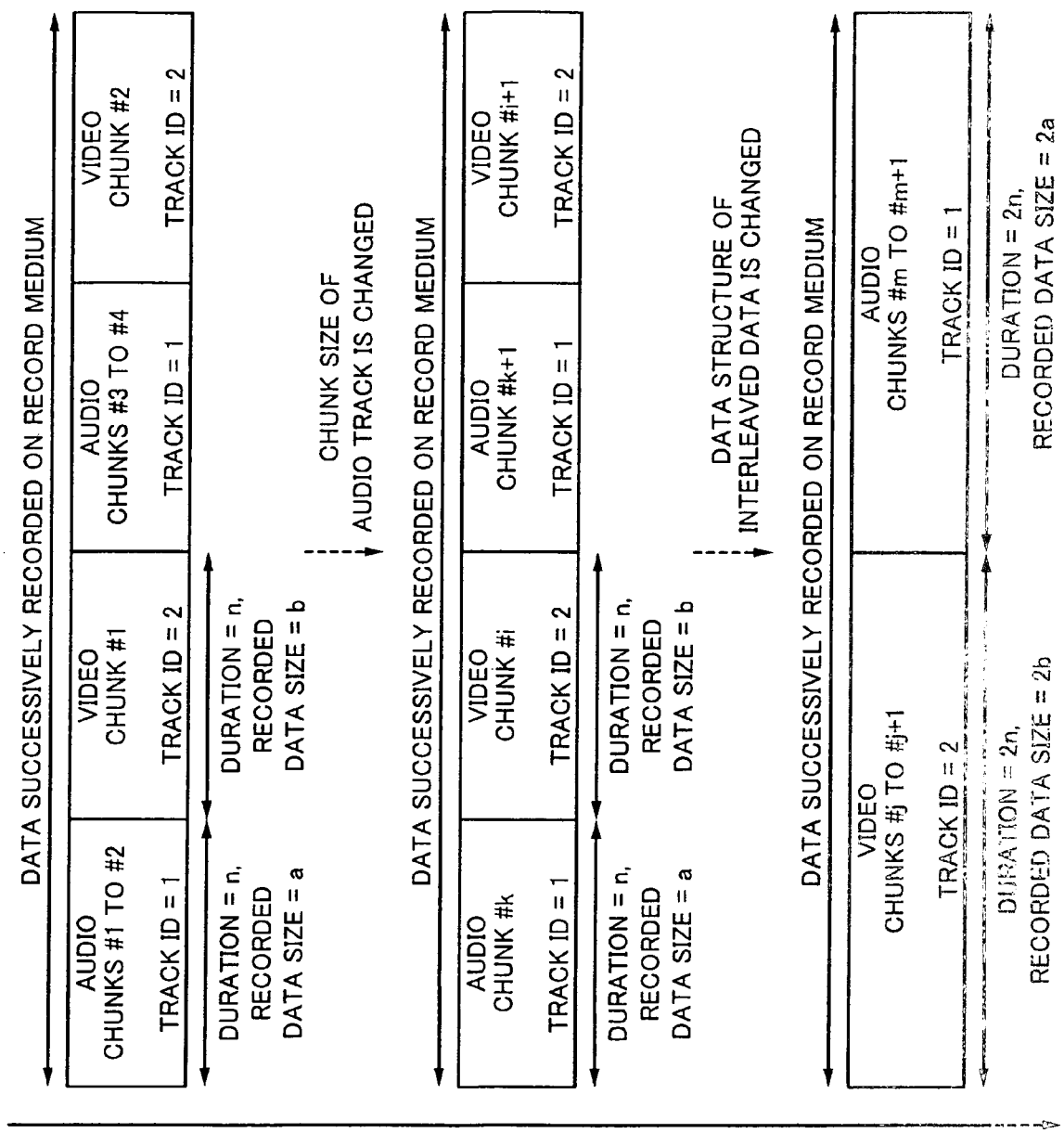

INTERLEAVED DATA DESCRIPTION TABLE

Fig. 11A

| FIELD | TABLE #1 AUDIO TRACK | TABLE #1 VIDEO TRACK |
|---|---|---|
| FIRST CHUNK | 1 | 1 |
| NEXT TRACK ID | 2 | 0 |
| NUMBER OF RECORDED CHUNKS | 2 | 1 |
| NUMBER OF REPEATS | 2 | 2 |
| DURATION | n | n |
| MAXIMUM RECORDED DATA SIZE | a | b |
| MINIMUM RECORDED DATA SIZE | a | b |
| AVERAGE RECORDED DATA SIZE | a | b |

Fig. 11B

| FIELD | TABLE #2 AUDIO TRACK |
|---|---|
| FIRST CHUNK | k |
| NEXT TRACK ID | 2 |
| NUMBER OF RECORDED CHUNKS | 2 |
| NUMBER OF REPEATS | 2 |
| DURATION | n |
| MAXIMUM RECORDED DATA SIZE | x |
| MINIMUM RECORDED DATA SIZE | y |
| AVERAGE RECORDED DATA SIZE | z |

Fig. 11C

| FIELD | TABLE #3 AUDIO TRACK | TABLE #2 VIDEO TRACK |
|---|---|---|
| FIRST CHUNK | m | j |
| NEXT TRACK ID | 2 | 0 |
| NUMBER OF RECORDED CHUNKS | 2 | 1 |
| NUMBER OF REPEATS | 2 | 2 |
| DURATION | n' | n' |
| MAXIMUM RECORDED DATA SIZE | x' | b' |
| MINIMUM RECORDED DATA SIZE | y' | b' |
| AVERAGE RECORDED DATA SIZE | z' | b' |

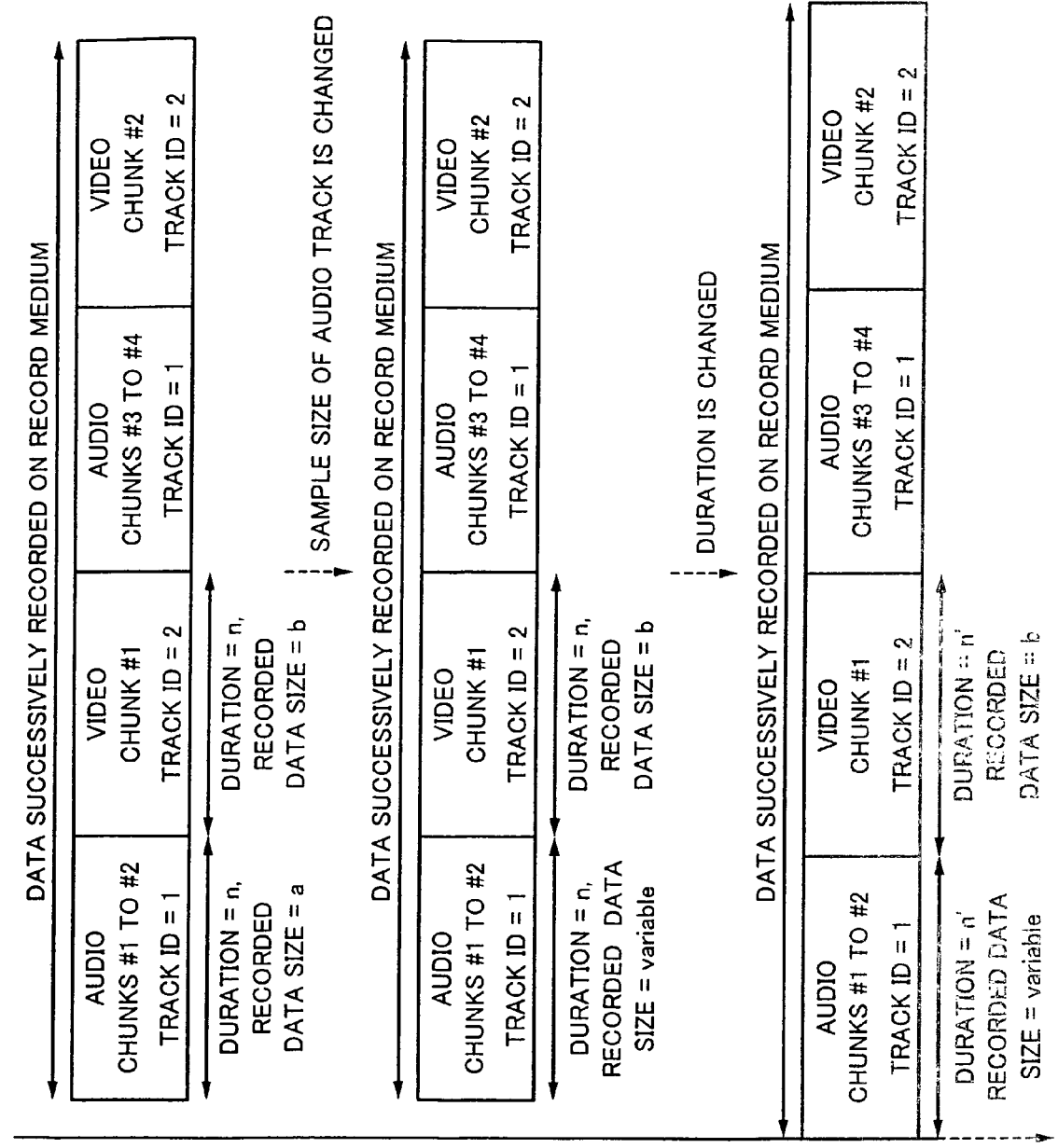

Fig. 15

| ATOM & FIELD | SIZE (BYTES) |
|---|---|
| Interleaved data description atom{ | |
|     atom size | 4 |
|     atom type = 'ilds' | 4 |
|     version | 1 |
|     flag | 2 |
|     Group description atom{ | |
|         atom size | 4 |
|         atom type = 'gpds' | 4 |
|         version | 1 |
|         Flag | 2 |
|         Number of entries | 4 |
|         Group description table{ | |
|             Group ID | 2 |
|             Parent ID | 2 |
|             Next Group ID | 2 |
|             Number of repeat | 1 |
|             reserved | 1 |
|         } | |
|     } | |
|     Track description atom{ | |
|         atom size | 4 |
|         atom type = 'tkds' | 4 |
|         version | 1 |
|         Flag | 2 |
|         Track ID | 4 |
|         Number of entries | 4 |
|         Track description table{ | |
|             Group ID | 2 |
|             First chunk | 4 |
|             Next track ID | 4 |
|             Number of recorded chunks | 2 |
|             Number of repeat | 1 |
|             Duration | 4 |
|             Max recorded data size | 4 |
|             Min recorded data size | 4 |
|             Average recorded data size | 4 |
|             reserved | 1 |
|         } | |
|     } | |
| } | |

Fig. 16

| ATOM & FIELD | SIZE (BYTES) |
|---|---|
| Interleaved data description atom{ | |
|   atom size | 4 |
|   atom type = 'ilds' | 4 |
|   version | 1 |
|   flag | 2 |
|   Group description atom{ | |
|     atom size | 4 |
|     atom type = 'gpds' | 4 |
|     version | 1 |
|     Flag | 2 |
|     Parent ID | 2 |
|     Number of entries | 4 |
|     Group description table{ | |
|       Group ID | 2 |
|       Next Group ID | 2 |
|       Number of repeat | 2 |
|       reserved | 1 |
|     } | |
|   } | |
|   Track description atom{ | |
|     atom size | 4 |
|     atom type = 'tkds' | 4 |
|     version | 1 |
|     Flag | 2 |
|     Track ID | 4 |
|     Group ID | 2 |
|     Number of entries | 4 |
|     Track description table{ | |
|       First chunk | 4 |
|       Next track ID | 4 |
|       Number of recorded chunks | 2 |
|       Number of repeat | 1 |
|       Duration | 4 |
|       Max recorded data size | 4 |
|       Min recorded data size | 4 |
|       Average recorded data size | 4 |
|       reserved | 1 |
|     } | |
|   } | |
| } | |

Fig. 17

| ATOM & FIELD | SIZE (BYTES) |
|---|---|
| Track property atom{ | |
|    atom size | 4 |
|    atom type = 'tkpt' | 4 |
|    version | 1 |
|    Flag | 2 |
|    Number of entries | 4 |
|    Track property table{ | |
|       Track ID | 4 |
|       Flag | 4 |
|       Media type | 4 |
|       MQT type | 4 |
|    } | |
| } | |

*Fig. 18*

| TRACK ID | FLAG 1 | FLAG 2 | MEDIA TYPE | MQT·TYPE |
|---|---|---|---|---|
| 1 | ENABLE | QT | vide | orig |
| 2 | ENABLE | QT | soun | orig |
| 3 | DISABLE | non | soun | afrv |
| 4 | DISABLE | non | vide | chap |
| 5 | DISABLE | QT | text | chap |
| 6 | ENABLE | QT | soun | bgmc |

Fig. 19A

GROUP DESCRIPTION TABLE

| FIELD | TABLE #1 | TABLE #2 |
|---|---|---|
| GROUP ID | 1 | 2 |
| PARENT ID | 0 | 0 |
| NEXT GROUP ID | 0 | 1 |
| NUMBER OF REPEATS | 2 | 2 |

Fig. 19B

TRACK DESCRIPTION TABLE

| FIELD | TABLE #1 AUDIO TRACK 1 | TABLE #1 VIDEO TRACK 2 | TABLE #1 AUDIO TRACK 3 |
|---|---|---|---|
| GROUP ID | 1 | 1 | 2 |
| FIRST CHUNK | 1 | 1 | 1 |
| NEXT TRACK ID | 2 | 0 | 0 |
| NUMBER OF RECORDED CHUNKS | 2 | 1 | 4 |
| NUMBER OF REPEATS | 2 | 2 | 1 |
| DURATION | n | n | 2n |
| MAXIMUM RECORDED DATA SIZE | a | b | c |
| MINIMUM RECORDED DATA SIZE | a | b | c |
| AVERAGE RECORDED DATA SIZE | a | b | c |

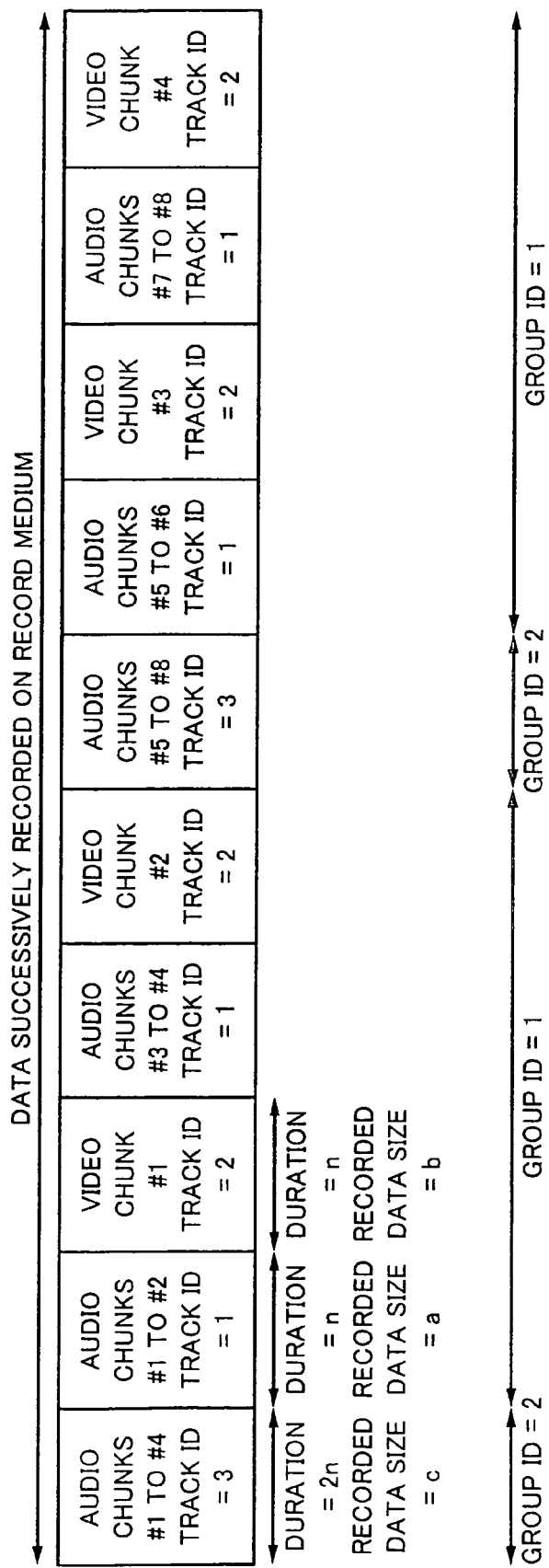

Fig. 20A

GROUP DESCRIPTION TABLE

| FIELD | TABLE #1 |
|---|---|
| GROUP ID | 1 |
| PARENT ID | 0 |
| NEXT GROUP ID | 0 |
| NUMBER OF REPEATS | 2 |

Fig. 20B

TRACK DESCRIPTION TABLE

| FIELD | TABLE #1 AUDIO TRACK 1 | TABLE #1 VIDEO TRACK 2 | TABLE #1 AUDIO TRACK 3 |
|---|---|---|---|
| GROUP ID | 1 | 1 | 1 |
| FIRST CHUNK | 1 | 1 | 1 |
| NEXT TRACK ID | 2 | 0 | 1 |
| NUMBER OF RECORDED CHUNKS | 2 | 1 | 4 |
| NUMBER OF REPEATS | 2 | 2 | 1 |
| DURATION | n | n | 2n |
| MAXIMUM RECORDED DATA SIZE | a | b | c |
| MINIMUM RECORDED DATA SIZE | a | b | c |
| AVERAGE RECORDED DATA SIZE | a | b | c |

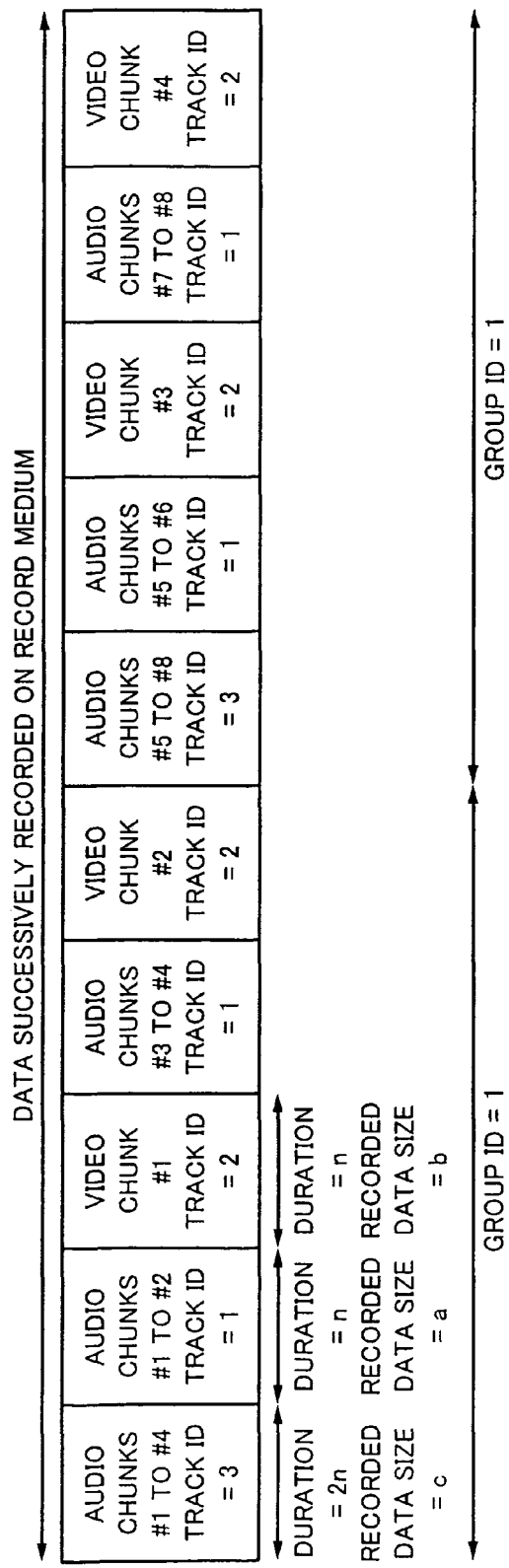

Fig. 21A

GROUP DESCRIPTION TABLE

| FIELD | TABLE #1 | TABLE #2 | TABLE #3 |
|---|---|---|---|
| GROUP ID | 1 | 2 | 3 |
| PARENT ID | 0 | 0 | 0 |
| NEXT GROUP ID | 3 | 1 | 0 |
| NUMBER OF REPEATS | 2 | 1 | 1 |

Fig. 21B

TRACK DESCRIPTION TABLE

| FIELD | TABLE #1 AUDIO TRACK 1 | TABLE #1 VIDEO TRACK 2 | TABLE #1 AUDIO TRACK 3 | TABLE #1 AUDIO TRACK 4 |
|---|---|---|---|---|
| GROUP ID | 1 | 1 | 2 | 3 |
| FIRST CHUNK | 1 | 1 | 1 | 1 |
| NEXT TRACK ID | 2 | 0 | 0 | 0 |
| NUMBER OF RECORDED CHUNKS | 2 | 1 | 4 | 4 |
| NUMBER OF REPEATS | 2 | 2 | 1 | 1 |
| DURATION | n | n | 4n | 4n |
| MAXIMUM RECORDED DATA SIZE | a | b | c | d |
| MINIMUM RECORDED DATA SIZE | a | b | c | d |
| AVERAGE RECORDED DATA SIZE | a | b | c | d |

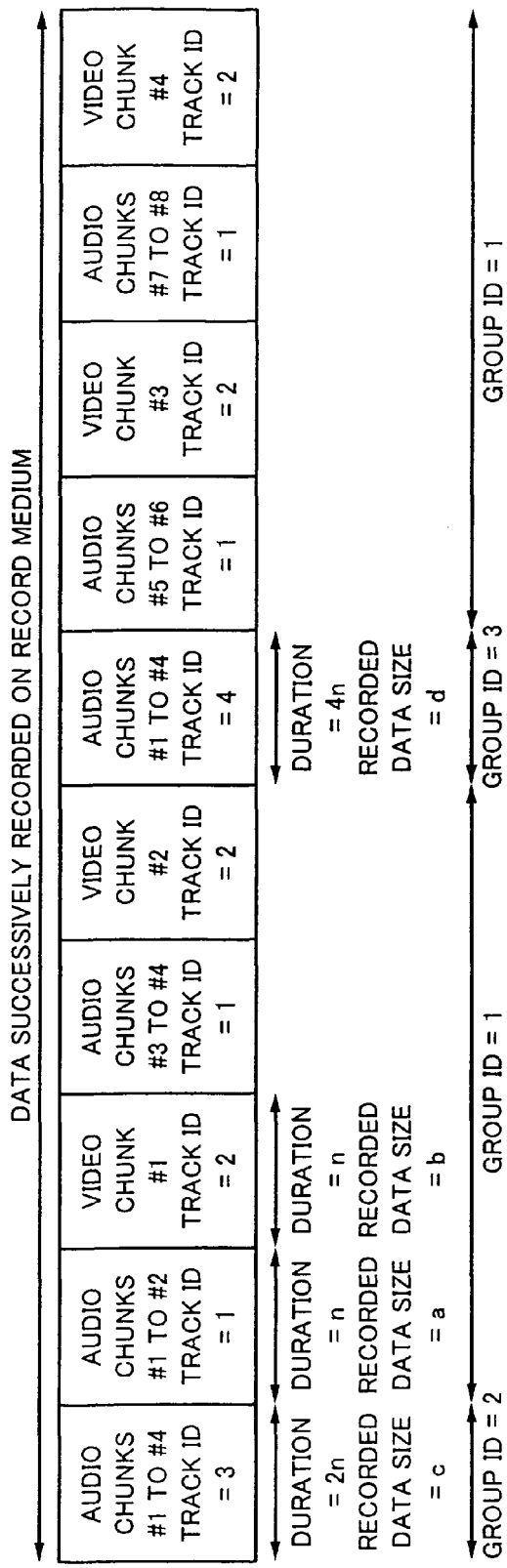

Fig. 22A

GROUP DESCRIPTION TABLE

| FIELD | TABLE #1 | TABLE #2 | TABLE #3 | TABLE #4 |
|---|---|---|---|---|
| GROUP ID | 1 | 2 | 1 | 3 |
| PARENT ID | 0 | 0 | 1 | 1 |
| NEXT GROUP ID | 0 | 1 | 0 | 1 |
| NUMBER OF REPEATS | 2 | 2 | 2 | 2 |

Fig. 22B

TRACK DESCRIPTION TABLE

| FIELD | TABLE #1 AUDIO TRACK 1 | TABLE #1 VIDEO TRACK 2 | TABLE #1 AUDIO TRACK 3 | TABLE #1 AUDIO TRACK 4 |
|---|---|---|---|---|
| GROUP ID | 1 | 1 | 2 | 3 |
| FIRST CHUNK | 1 | 1 | 1 | 1 |
| NEXT TRACK ID | 2 | 0 | 0 | 0 |
| NUMBER OF RECORDED CHUNKS | 2 | 1 | 4 | 4 |
| NUMBER OF REPEATS | 2 | 2 | 1 | 1 |
| DURATION | n | n | 2n | 2n |
| MAXIMUM RECORDED DATA SIZE | a | b | c | d |
| MINIMUM RECORDED DATA SIZE | a | b | c | d |
| AVERAGE RECORDED DATA SIZE | a | b | c | d |

Fig. 23A

GROUP DESCRIPTION TABLE

| FIELD | TABLE #1 |
|---|---|
| GROUP ID | 1 |
| PARENT ID | 0 |
| NEXT GROUP ID | 0 |
| NUMBER OF REPEATS | 1 |

Fig. 23B

TRACK DESCRIPTION TABLE FOR AUDIO TRACK

| FIELD | TABLE #1 AUDIO TRACK |
|---|---|
| GROUP ID | 1 |
| FIRST CHUNK | 1 |
| NEXT TRACK ID | 2 |
| NUMBER OF RECORDED CHUNKS | 2 |
| NUMBER OF REPEATS | 2 |
| DURATION | n |
| MAXIMUM RECORDED DATA SIZE | a |
| MINIMUM RECORDED DATA SIZE | a |
| AVERAGE RECORDED DATA SIZE | a |

TRACK DESCRIPTION TABLE FOR VIDEO TRACK

| FIELD | TABLE #1 VIDEO TRACK |
|---|---|
| GROUP ID | 1 |
| FIRST CHUNK | 1 |
| NEXT TRACK ID | 0 |
| NUMBER OF RECORDED CHUNKS | 1 |
| NUMBER OF REPEATS | 2 |
| DURATION | n |
| MAXIMUM RECORDED DATA SIZE | b |
| MINIMUM RECORDED DATA SIZE | b |
| AVERAGE RECORDED DATA SIZE | b |

Fig. 24A'

GROUP DESCRIPTION TABLE

| FIELD | TABLE #1 |
|---|---|
| GROUP ID | 1 |
| PARENT ID | 0 |
| NEXT GROUP ID | 0 |
| NUMBER OF REPEATS | 1 |

Fig. 24B'

TRACK DESCRIPTION TABLE FOR AUDIO TRACKS

| FIELD | TABLE #1 AUDIO TRACK | TABLE #2 AUDIO TRACK |
|---|---|---|
| GROUP ID | 1 | 1 |
| FIRST CHUNK | 1 | k |
| NEXT TRACK ID | 2 | 2 |
| NUMBER OF RECORDED CHUNKS | 2 | 1 |
| NUMBER OF REPEATS | 2 | 2 |
| DURATION | n | n |
| MAXIMUM RECORDED DATA SIZE | a | a |
| MINIMUM RECORDED DATA SIZE | a | a |
| AVERAGE RECORDED DATA SIZE | a | a |

TRACK DESCRIPTION TABLE FOR VIDEO TRACK

| FIELD | TABLE #1<br>VIDEO TRACK |
|---|---|
| GROUP ID | 1 |
| FIRST CHUNK | 1 |
| NEXT TRACK ID | 0 |
| NUMBER OF RECORDED CHUNKS | 1 |
| NUMBER OF REPEATS | 2 |
| DURATION | n |
| MAXIMUM RECORDED DATA SIZE | b |
| MINIMUM RECORDED DATA SIZE | b |
| AVERAGE RECORDED DATA SIZE | b |

FIG. 25A"

GROUP DESCRIPTION TABLE

| FIELD | TABLE #1 | TABLE #2 |
|---|---|---|
| GROUP ID | 1 | 2 |
| PARENT ID | 0 | 1 |
| NEXT GROUP ID | 0 | 0 |
| NUMBER OF REPEATS | 1 | 1 |

Fig. 25B"

TRACK DESCRIPTION TABLE FOR AUDIO TRACKS

| FIELD | TABLE #1 AUDIO TRACK | TABLE #2 AUDIO TRACK | TABLE #3 AUDIO TRACK |
|---|---|---|---|
| GROUP ID | 1 | 1 | 2 |
| FIRST CHUNK | 1 | k | m |
| NEXT TRACK ID | 2 | 2 | 0 |
| NUMBER OF RECORDED CHUNKS | 2 | 1 | 2 |
| NUMBER OF REPEATS | 2 | 2 | 1 |
| DURATION | n | n | 2n |
| MAXIMUM RECORDED DATA SIZE | a | a | 2a |
| MINIMUM RECORDED DATA SIZE | a | a | 2a |
| AVERAGE RECORDED DATA SIZE | a | a | 2a |

Fig. 25C"
TRACK DESCRIPTION TABLE FOR VIDEO TRACKS
| FIELD | TABLE #1 VIDEO TRACK | TABLE #2 VIDEO TRACK |
|---|---|---|
| GROUP ID | 1 | 2 |
| FIRST CHUNK | 1 | j |
| NEXT TRACK ID | 0 | 1 |
| NUMBER OF RECORDED CHUNKS | 1 | 2 |
| NUMBER OF REPEATS | 2 | 1 |
| DURATION | n | 2n |
| MAXIMUM RECORDED DATA SIZE | b | 2b |
| MINIMUM RECORDED DATA SIZE | b | 2b |
| AVERAGE RECORDED DATA SIZE | b | 2b |
Fig. 25D"
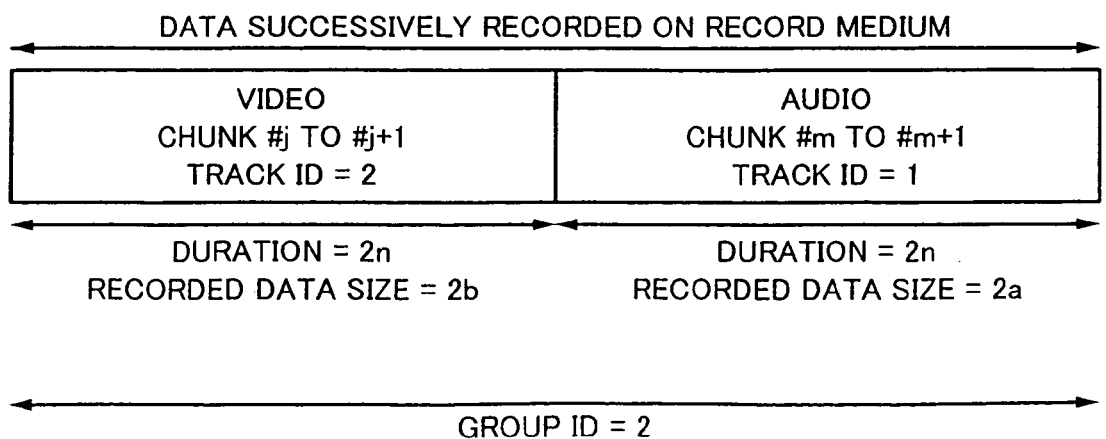

RECORDING APPARATUS AND RECORDING MEDIUM

This is a division of application Ser. No. 10/221,470, filed Sep. 12, 2002 now U.S. Pat. No. 7,853,116 pursuant to 35 USC 371 and based on International Application PCT/JP02/00177, which is entitled to the priority filing dates of Japanese applications 2001-006210, filed in Japan on Jan. 15, 2001, and 2001-040717, filed in Japan on Feb. 16, 2001, the entirety of which is incorporated herein by reference.

TECHNICAL FIELD

The present invention relates to a recording apparatus that records data on a record medium, in particular, to a recording apparatus that records information with respect to a data read time necessary for reading data from a record medium, a drive seek time, a successive reproduction time, and a successive record length. In addition, the present invention relates to a recording apparatus that records the relation among a plurality of pieces of data recorded on a record medium. Moreover, the present invention relates to a record medium on which such information has been recorded.

BACKGROUND ART

Since a moving picture is treated as a set of still pictures that have been reproduced in a time series, a moving picture recording and reproducing apparatus that records and reproduces a moving picture should record and reproduce a sequence of still picture data in a time series. To do that, a file for managing chronological relation of still picture data is required.

Such a moving picture recording and reproducing apparatus records data on a randomly accessible record medium such as an optical disc in such a manner that data is dispersedly recorded as blocks having a predetermined amount. In addition, the apparatus reproduces data from a record medium in such a manner that the apparatus determines the position of data to be reproduced from the record medium corresponding to such a management file, moves a reading portion such as an optical pickup to the determined position, reads the data as a block having a predetermined amount, and reproduces the data corresponding to the management file.

On the other hand, as software programs that handle a sequence of data that varies in a time series (such data is referred to as a movie), for example, QuickTime (hereinafter abbreviated as "QT") and Video for Windows are known.

QT is a software program that manages various types of data along the time base and that has an OS extension function for synchronously reproducing a moving picture, a sound, a text, and so forth without need to use a special hardware device. With QT, an application program can handle multimedia data without consideration of data type, data format, compression format, and hardware structure. In addition, QT has a structure that can be easily extended. Thus, QT has been widely used. QT has been disclosed in for example "Inside Macintosh: QuickTime (Japanese Edition)", Addison Wesley. Next, QT will be described in brief.

A basic data unit of a QT movie resource is called an atom. Each atom contains a size and type information along with its data. In QT, the minimum unit of data is treated as a sample. As a set of samples, a chunk is defined.

FIG. 26 is a schematic diagram showing an example of the structure of a QuickTime movie file.

FIG. 27 is a schematic diagram showing an example of the structure of a video media information atom. FIG. 27 is a detailed schematic diagram showing a video media information atom in the case that tracks are for video information.

In FIGS. 26 and 27, a QuickTime movie file is mainly composed of two portions that are a movie atom 501 and a media data atom 502. The movie atom 501 is a portion that stores information necessary for reproducing a file and information necessary for referencing real data. The media data atom 502 is a portion that stores real data such as video data and audio data.

The movie atom 501 contains a size, a type "moov", a movie header atom 511, a movie clipping atom 512, a user definition data atom 513, and at least one track atom 514.

The movie header atom 511 has a type "mvhd" and contains information with respect to the entire movie such as a time scale and a length.

The movie clipping atom 512 has a type "clip" and contains a clipping area atom 521. The movie clipping atom 512 designates a clipping area for a movie and a track. The clipping area atom 521 has a type "crgn".

The user definition data atom 513 has a type "udat" and contains a movie user data atom 522. The movie user data atom 522 can store data.

The track atom 514 is provided for each track of a movie. The track atom 514 contains a size, a type "trak", a track header atom 531, a track clipping atom 532, a track matte atom 533, an edit atom 534, and a media atom 535. The track atom 514 describes information with respect to individual pieces of data of the media data atom 502 in the atoms 531 to 535. FIG. 26 shows only a track atom 514-1 of a video movie (omitting other track atoms).

The track header atom 531 has a type "tkhd" and describes time information, space information, audio volume information, and so forth and defines the characteristic of tracks of a movie.

The track clipping atom 532 has a type "clip" and contains a clipping area atom 541. The track clipping atom 532 operates in the same manner as the movie clipping atom 512.

The track matte atom 533 has a type "matt" and contains a compression matt atom 542. The track matte atom 533 designates a matt of tracks. The compression matt atom 542 has a type "kmat" and designates an image description structure.

The edit atom 534 has a type "edts" and contains an edit list atom 543. The edit atom 534 causes the edit list atom 543 to define a media portion that composes one track of a movie. The edit list atom 543 has a type "elst". An edit list table composed of a track length, a media time, and a media speed causes QT to map a track time to a media time and finally to media data.

The media atom 535 describes data of a movie track. The media atom 535 also describes information that defines a component that interprets media data. The media atom 535 also defines data information of the media. The media atom 535 has a size and a type "mdia" and contains a media header atom 544, a media information atom (video media information atom 545 in FIGS. 26 and 27), and a media handler reference atom 546.

The media header atom 544 has a type "mdhd" and contains a time value that represents a time scale of media and a time value that represents a length of media. The media header atom 544 defines the characteristic of media.

The media handler reference atom 546 describes information with respect to entire media and defines the characteristic of media as a storage location corresponding to a movie track. The media handler reference atom 546 has a type "mhlr" and designates a component that interprets data stored in media. The component is called by a media handler.

The media information atom 545 stores information intrinsic to a handler for media data that composes a track. The media handler maps a media time to media data using the information. The media information atom 545 has a type "minf" and contains a data handler reference atom 561, a media information header atom, a data information atom 563, and a sample table atom 564.

The media information header atom (a video media information header atom 562 in FIG. 27) describes information with respect to media. The data handler reference atom 561 has a type "hdlr" and describes information with respect to handling of media data. The data handler reference atom 561 contains information that designates a data handler component that provides an access means for media data.

The data information atom 563 has a type "dinf" and contains a data reference atom 571. The data reference atom 571 describes information with respect to data.

The sample table atom 564 has a type "stbl" and contains information necessary for converting a media time into a sample number that represents a sample position. The sample table atom 564 is composed of a sample size atom 572, a time-to-sample atom 573, a sync sample atom 574, a sample description atom 575, a sample-to-chunk atom 576, and a chunk offset atom 577.

The sample size atom 572 has a type "stsz" and describes the size of a sample. The time-to-sample atom 573 has a type "stts" and describes the relation between samples and time base (how many minutes of data have been recorded ?). The sync sample atom 574 describes information with respect to synchronization and designates a key frame of medium. A key frame is a self included frame that does not depend on the preceding frame. The sync sample atom 574 has a type "stss". The sample description atom 575 has a type "stsd" and stores information necessary for decoding a sample of medium. Media can have at least one sample description atom corresponding to a compression type used in media. The sample-to-chunk atom 576 references a table contained in the sample description atom 575 and identifies a sample description corresponding to each sample of medium. The sample-to-chunk atom 576 has a type "stsc" and describes the relation between a sample and a chunk. The sample-to-chunk atom 576 identifies the position of a sample of media corresponding to the first chunk, the number of samples per chunk and information of a sample description ID. The chunk offset atom 577 has a type "stco" and describes the start bit position of a chunk of movie data and defines the position of each chunk of a data stream.

In FIG. 26, the media data atom 502 stores audio data encoded corresponding to a predetermined compressing and encoding system and video data that has been encoded corresponding to a predetermined compressing and encoding system in the unit of a chunk composed of a predetermined number of samples. It is not always necessary to compress and encode data. Alternatively, linear data can be stored. For example, when text, MIDI (Musical Instrument Digital Interface), or the like is handled, the media data atom 502 contains real data of text, MIDI, or the like. Correspondingly, the movie atom 501 contains a text track, a MIDI track, or the like.

Each track of the movie atom 501 is correlated with data stored in the media data atom 502.

In such a hierarchical structure, when data stored in the media data atom 502 is reproduced, QT successively traces the hierarchical structure from the movie atom 501 in the highest hierarchical level, maps a sample table to memory corresponding to the atoms 572 to 578 in the lowest hierarchical level in the sample table atom 564, and identifies the relation among individual data pieces.

In addition, QT has a chapter function for displaying text data at a predetermined time of a movie as a function that represents the relation among data pieces.

However, when the data structure of a management file is hierarchical and information with respect to each data piece is dispersed in lower layers as with QT, a moving picture recording and reproducing apparatus should trace the hierarchy to lower levels and collect dispersed information therefrom.

In addition, since it is assumed that a sequence of time series data is recorded as blocks each having a predetermined amount, when the size of each block is changed, the corresponding operation is required.

When a sequence of time series data is edited, a data read time, a seek time, and a reproduction time for read data are required so that the data can be successively reproduced.

Although a chapter function that represents the relation among data pieces is provided, a predetermined process for correlating a predetermined time of a movie with a chapter is performed. Thus, the relation among data pieces can be flexibly represented. Consequently, when there are audio data A and audio data B that are chronologically correlated with video data X, it is impossible to correlate the video data X with the audio data A or the audio data B so as to reproduce them.

DISCLOSURE OF THE INVENTION

An object of the present invention is to provide a recording apparatus and a record medium that satisfy the forgoing requirements.

A first aspect of the present invention is a recoding apparatus for recording data to a rewritable record medium, comprising an encoding means for encoding the data corresponding to a predetermined compressing and encoding system, a converting means for converting a data structure of encoded data that is output from the encoding means into a file structure that a computer software program that synchronously reproduces a moving picture and so forth can handle without need to use a special hardware device, and a recording means for recording data having the file structure to the record medium, wherein the file structure has a first data unit, a second data unit, and a data portion, the second data unit being a set of a plurality of first data units, the data portion describing management information, wherein the plurality of second data units is correlated with a successive record length of the record medium, and wherein the data portion contains a time length and a data length of the second data unit recorded in the successive record length.

A second aspect of the present invention is a recording apparatus for recording data to a rewritable record medium, comprising an encoding means for encoding the data corresponding to a predetermined compressing and encoding system, a converting means for converting a data structure of encoded data that is output from the encoding means into a file structure that a computer software program that synchronously reproduces a moving picture and so forth can handle without need to use a special hardware device, and a recording means for recording data having the file structure to the record medium, wherein the file structure has a first data unit, a second data unit, and a data portion, the second data unit being a set of a plurality of first data units, the data portion describing management information, wherein the plurality of second data units is correlated with a successive record length of the record medium, and wherein the data portion contains information representing a data type of the first data unit, information representing the record sequence of the plurality of first data units, information representing the number of successive first data units for each data type, information representing the number of times of which successive first data units are repeated for each data type, and information identifying the beginning first data unit corresponding to the second data unit recorded in the successive record length.

According to the first aspect or the second aspect, the data length is at least one of the maximum value, the minimum value, and the average value of the plurality of second data units recorded on the record medium.

In addition, according to the first aspect or the second aspect, the file structure has a hierarchy, the data portion being placed in any hierarchical level other than the lowest hierarchical level, alternatively, the data portion being placed in the highest hierarchical level.

According to the first aspect or the second aspect, the data portion further contains a read time necessary for reading the data from the record medium. In particular, the read time is a seek time and a playback rate.

According to the first aspect or the second aspect, a part of the plurality of second data units is pre-allocated as a reserved area for data that is recorded after the plurality of second data units is recorded on the record medium corresponding to the successive record length. In addition, the data portion contains information representing the reserved area.

A third aspect of the present invention is a recording apparatus, comprising a means for generating a management file for managing a plurality of pieces of data so that they can be reproduced in a time series, and a means for recording the plurality of pieces of data and the management file on a rewritable record medium, wherein the plurality of pieces of data is managed as a collection of a first data unit and a second data unit, the second data unit being a set of a plurality of first data units, wherein the plurality of second data units is correlated with a successive record length of the record medium, and wherein the management file contains a time length and a data length of the second data unit recorded in the successive record length and a read time necessary for reading the data from the record medium.

A fourth aspect of the present invention is a computer readable record medium on which a plurality of pieces of data is recorded as a first data unit, a second data unit, and a data portion, the second data unit being a set of a plurality of first data units, the data portion describing management information for managing the plurality of pieces of data, wherein the plurality of second data units is correlatively recorded in a successive record length of the record medium, and wherein the data portion contains a time length and a data length of the second data unit recorded in the successive record length.

A fifth aspect of the present invention is a computer readable record medium on which a plurality of pieces of data is recorded as a first data unit, a second data unit, and a data portion, the second data unit being a set of a plurality of first data units, the data portion describing management information for managing the plurality of pieces of data, wherein the plurality of second data units is correlatively recorded to a successive record length of the record medium, and wherein the data portion contains information representing a data type of the first data unit, information representing the record sequence of the plurality of first data units, information representing the number of successive first data units for each data type, information representing the number of times of which successive first data units are repeated for each data type, and information identifying the beginning first data unit corresponding to the second data unit recorded in the successive record length.

A sixth aspect of the present invention is a computer readable record medium on which a plurality of pieces of data and a management file are recorded, the management file being used to manage the plurality of pieces of data in a time series, wherein the plurality of pieces of data is recorded as a first data unit and a second data unit, the second data unit being a set of a plurality of first data units, the plurality of second data units being correlatively recorded in a successive record length of the record medium, and wherein the management file contains a time length and a data length of the second data unit recorded in the successive record length and a read time necessary for reading the data from the record medium.

In such recording apparatus and record medium, since information for data recorded in a successive record length is collectively recorded, the recoding apparatus can easily know the relation among data pieces. Particularly, in a hierarchical file structure, when such information is described in a higher hierarchical level, the apparatus can quickly know the relation among data pieces.

In addition, various types of information representing a data type of the first data unit, information representing the record sequence of the plurality of first data units, information representing the number of successive first data units for each data type, information representing the number of times of which successive first data units are repeated for each data type, and information identifying the beginning first data unit are recorded corresponding to the second data unit recorded in the successive record length. Thus, even if data size is changed, data can be edited so that the edited data can be successively reproduced.

A seventh aspect of the present invention is a recoding apparatus for recording data to a rewritable record medium, comprising an encoding means for encoding the data corresponding to a predetermined compressing and encoding system, a converting means for converting a data structure of encoded data that is output from the encoding means into a file structure that a computer software program that synchronously reproduces a moving picture and so forth can handle without need to use a special hardware device, and a recording means for recording data having the file structure to the record medium, wherein the file structure has a first data unit, a second data unit, and a data portion, the second data unit being a set of a plurality of first data units, the data portion describing management information, wherein the plurality of second data units is correlated with a successive record length of the record medium, and wherein the data portion contains first hierarchical information and second hierarchical information, the second data unit recorded in the successive record length being divided into a plurality of groups in a repeated pattern corresponding to the type of the first data unit, the first hierarchical information describing the sequence of the plurality of first data units in one group, the second hierarchy information describing the sequence of the plurality of groups.

In the recording apparatus according to the seventh aspect of the present invention, the first hierarchical information contains information representing to which of the plurality of groups the first data unit belongs, information representing the data type of the first data unit, information representing the record sequence of the plurality of first data units, information representing the number of successive first data units for each data type, information representing the number of times of which the successive first data units are repeated for each data type, and information identifying the beginning first data unit, and wherein the second hierarchical information contains information representing the types of the groups, information representing which of the plurality of groups is synchronized with the computer software program, information representing the record sequence of the plurality of groups, and information representing the number of successive groups.

In the recording apparatus according to the seventh aspect of the present invention, the data portion may further contain the data type of the first data unit and a data attribute of the first data unit.

An eighth aspect of the present invention is a computer readable record medium on which a plurality of pieces of data is recorded as a first data unit, a second data unit, and a data portion, the second data unit being a set of a plurality of first data units, the data portion describing management information for managing the plurality of pieces of data, wherein the plurality of second data units is correlatively recorded to a successive record length of the record medium, and wherein the data portion contains first hierarchical information and second hierarchical information, the second data unit recorded in the successive record length being divided into a plurality of groups in a repeated pattern corresponding to the type of the first data unit, the first hierarchical information describing the sequence of the plurality of first data units in one group, the second hierarchy information describing the sequence of the plurality of groups.

In such recording apparatus and record medium, since the sequence of first data units is managed by management information hierarchically structured in a plurality of hierarchical levels, the sequence of first data units can be flexibly described.

BRIEF DESCRIPTION OF DRAWINGS

FIG. 4 is a schematic diagram showing the structure of a QuickTime movie file;

FIG. 5 is a schematic diagram showing an example of the data structure of a QuickTime movie file;

FIG. 6 is a schematic diagram showing another example of the data structure of a QuickTime movie file;

FIG. 9A, FIG. 9B, and FIG. 9C are schematic diagrams showing an interleaved data description table according to a third example of the present invention;

FIG. 10A", FIG. 10B", and FIG. 10C" are schematic diagrams showing data successively recorded on a record medium according to the third example of the present invention;

FIG. 11A, FIG. 11B, and FIG. 11C are schematic diagrams showing an interleaved data description table according to a fourth example of the present invention;

FIG. 12A", FIG. 12B", and FIG. 12C" are schematic diagrams showing data successively recorded on a record medium according to the fourth example of the present invention;

FIG. 15 is a schematic diagram showing an example of the data structure of an interleave description data atom;

FIG. 16 is a schematic diagram showing another example of the data structure of the interleave description data atom;

FIG. 17 is a schematic diagram showing an example of the data structure of a track property atom;

FIG. 18 is a schematic diagram showing an example of a track property atom;

FIG. 19A is a schematic diagram showing a group description table according to a fifth example of the present invention; FIG. 19B is a schematic diagram showing a track description table according to the fifth example of the present invention; FIG. 19C is a schematic diagram showing data successively recorded on a record medium according to the fifth example of the present invention;

FIG. 20A is a schematic diagram showing a group description table according to a sixth example of the present invention; FIG. 20B is a schematic diagram showing a track description table according to the sixth example of the present invention; FIG. 20C is a schematic diagram showing data successively recorded on a record medium according to the sixth example of the present invention;

FIG. 21A is a schematic diagram showing a group description table according to a seventh example of the present invention; FIG. 21B is a schematic diagram showing a track description table according to the seventh example of the present invention; FIG. 21C is a schematic diagram showing data successively recorded on a record medium according to the seventh example of the present invention;

FIG. 22A" is a schematic diagram showing a group description table according to an eighth example of the present invention; FIG. 22B" is a schematic diagram showing a track description table according to the eighth example of the present invention.

FIG. 23A is a schematic diagram showing a group description table according to a ninth example of the present invention; FIG. 23B is a schematic diagram showing a track description table for audio tracks according to the ninth example of the present invention.

FIG. 24A' is a schematic diagram showing a group description table according to a tenth example of the present invention; FIG. 24B' is a schematic diagram showing a track description table for audio tracks according to the tenth example of the present invention.

FIG. 25A" is a schematic diagram showing a group description table according to the tenth example of the present invention; FIG. 25B" is a schematic diagram showing a track description table for audio tracks according to the tenth example of the present invention; FIG. 25C" is a schematic diagram showing a track description table for video tracks according to the tenth example of the present invention; FIG. 25D" is a schematic diagram showing data successively recorded on a record medium according to the tenth example of the present invention;

BEST MODES FOR CARRYING OUT THE INVENTION

Next, with reference to the accompanying drawings, embodiments of the present invention will be described. In each drawing, for simplicity, the description of similar structures may be omitted.

First Embodiment

According to a first embodiment of the present invention, a video signal and an audio signal are encoded corresponding to a predetermined compressing and decompressing system. Real data that has been encoded in a format that an application program that manages a sequence of real data in a time series can handle is managed. The real data and management data are recoded on a record medium in a predetermined format. In addition, according to the present invention, real data that has been recorded is inversely processed with reference to the management data so as to reproduce the video signal and the audio signal. One feature of the first embodiment is in that a QuickTime movie file has a file that describes a playback rate of the record medium, a successive record length, and a seek time of a drive for a record medium (a time necessary for moving from one track to a different track and reproducing data from the different track).

According to the first embodiment, MPEG (Moving Picture Coding Experts Group) system as a predetermined compressing and decompressing system, QT as an application program, and UDF (Universal Disk Format Specification) are used.

In the MPEG system, a compression and a decompression are performed basically using discrete cosine transform (DCT), motion compensation inter-frame prediction, and variable length encoding. To easily perform a random access, a GOP (Group Of Pictures) structure of which an I picture (intra-coded picture), a P picture (predictive-coded picture), and a B picture (bi-directionally predictive-coded picture) are combined is used.

UDF is a standard with respect to a high density optical disc. UDF is a hierarchical file system. A sub directory is referenced from information stored in a root directory. Another sub directory and a real file are referenced from information stored in another sub directory.

Next, the structure of the recording and reproducing apparatus will be described.

Figure 1:
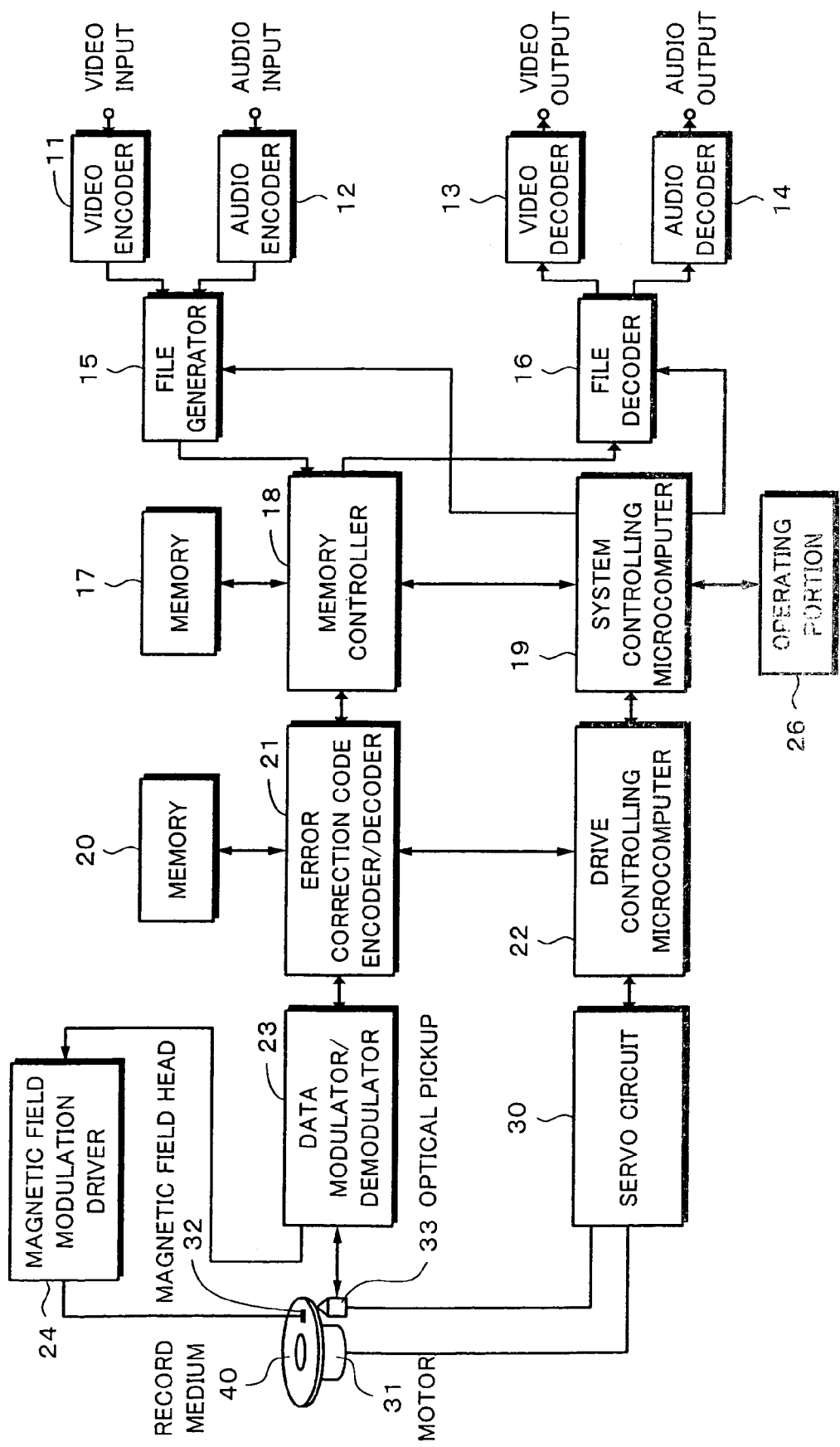
FIG. 1 is a block diagram showing the structure of a digital recording and reproducing apparatus.

FIG. 1 is a block diagram showing the structure of a digital recording and reproducing apparatus.

Figure 2:
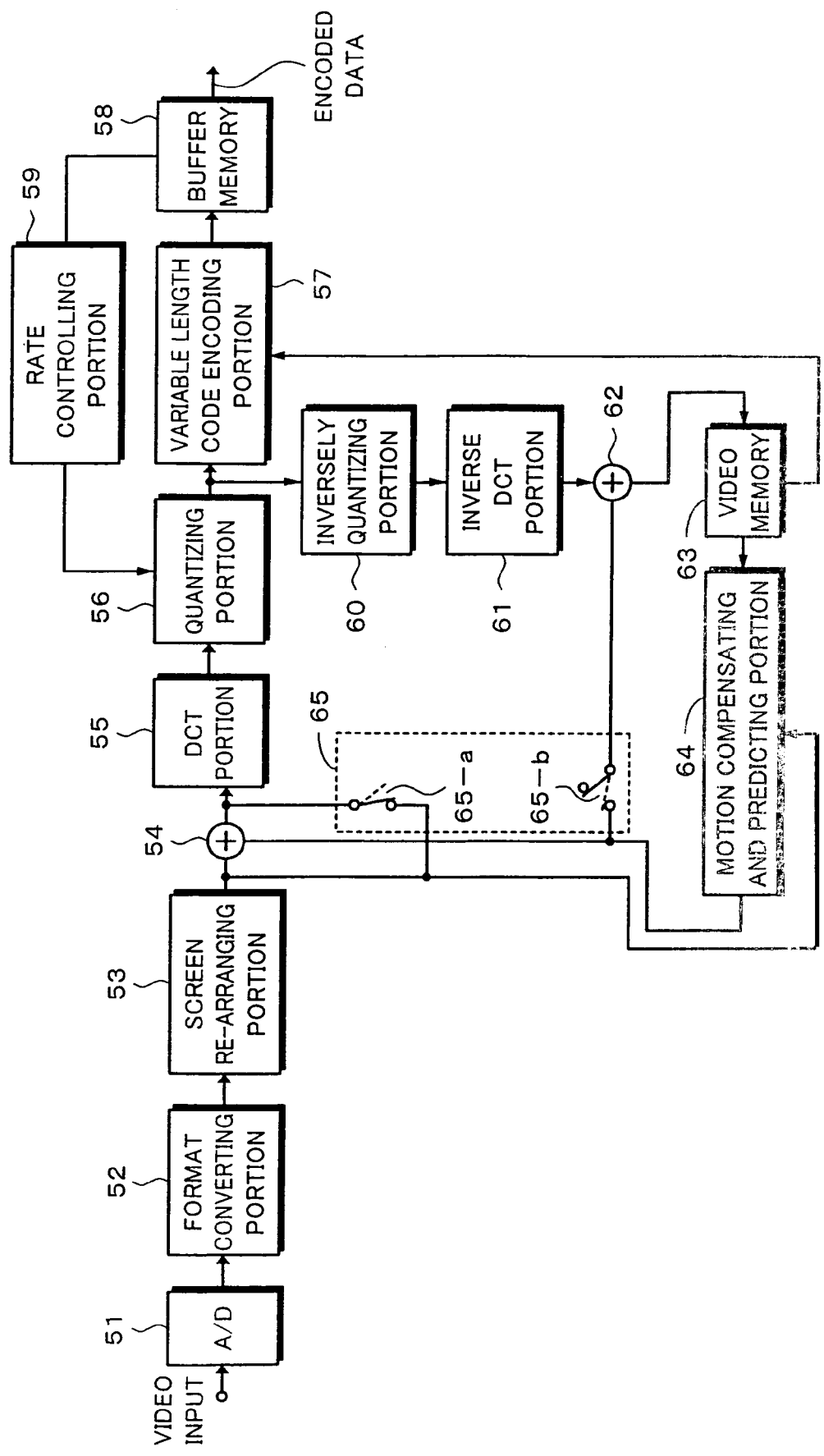
FIG. 2 is a block diagram showing the structure of a video encoder.

FIG. 2 is a block diagram showing the structure of a video encoder.

Figure 3:
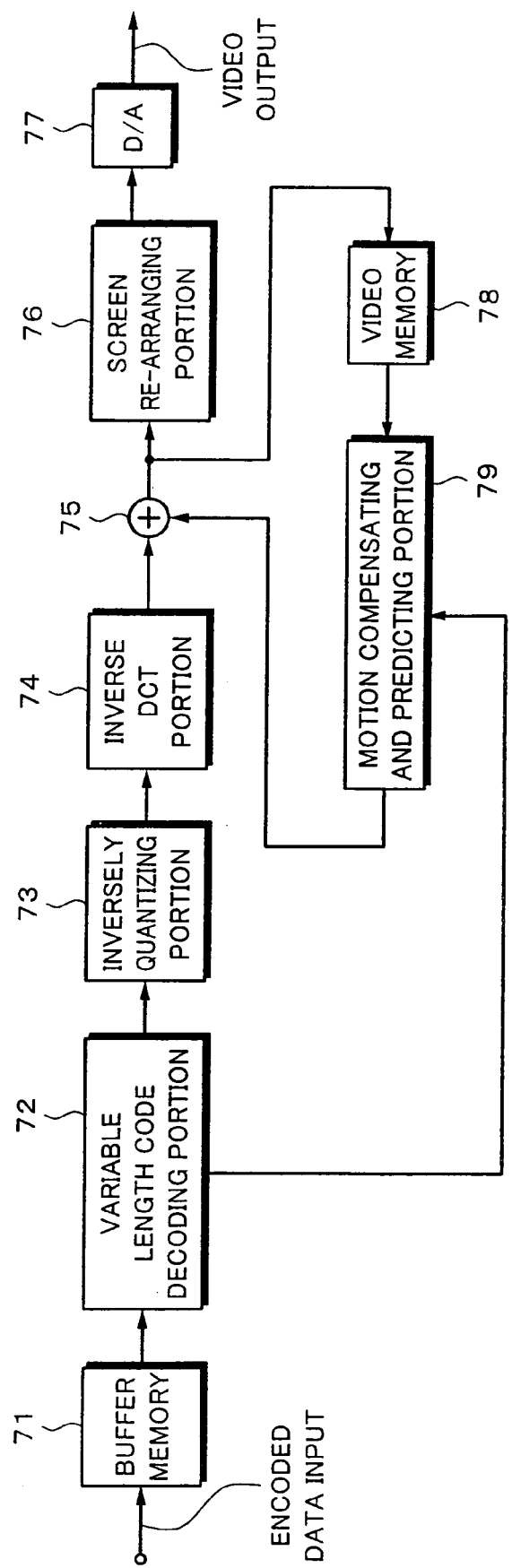
FIG. 3 is a block diagram showing the structure of a video decoder.

FIG. 3 is a block diagram showing the structure of a video decoder.

In FIGS. 1 to 3, the digital recording and reproducing apparatus comprises a video encoder 11, an audio encoder 12, a video decoder 13, an audio decoder 14, a file generator 15, a file decoder 16, memories 17 and 20, a memory controller 18, a system controlling microcomputer 19, an error correction code encoder/decoder 21, a drive controlling microcomputer 22, a data modulator/demodulator 23, a magnetic field modulation driver 24, an operating portion 26, a servo circuit 30, a motor 31, a magnetic field head 32, and an optical pickup 33.

A video signal is input from a vide input terminal. The video signal is supplied to the video encoder 11. The video encoder 11 compresses and encodes the video signal. An audio signal is input from an audio input terminal. The audio signal is supplied to the audio encoder 12. The audio encoder 12 compresses and encodes the audio signal. Output signals of the video encoder 11 and the audio encoder 12 are called elementary steams.

According to the first embodiment, it is assumed that the digital recording and reproducing apparatus is an apparatus integrated with a camera. The video signal is supplied as a picture photographed by the video camera. An optical system supplies photographed light of an object to a photographing device such as CCD (Charge Coupled Device) and generates a video signal. As the audio signal, a sound collected by a microphone is supplied.

When the compressing and encoding process corresponds to the MPEG system, as shown in FIG. 2, the video encoder 11 comprises an analog/digital converter (hereinafter abbreviated as "A/D") 51, a format converting portion 52, a screen re-arranging portion 53, a subtracting portion 54, a DCT portion 55, a quantizing portion 56, a variable length code encoding portion 57, a buffer memory 58, a rate controlling portion 59, an inversely quantizing portion 60, an inverse DCT portion 61, an adding portion 62, a video memory 63, a motion compensating and predicting portion 64, and a switch 65 as electronic circuits.

A video signal is supplied to the video encoder 11. The A/D 51 digitizes the video signal. The format converting portion 52 converts the digitized signal into a spatial resolution used in the encoding process. The spatial resolution is supplied to the screen re-arranging portion 53. The screen re-arranging portion 53 re-arranges the sequence of pictures so that they can be properly processed in the encoding process. In other words, the screen re-arranging portion 53 re-arranges the sequence of pictures so that I pictures and P pictures are encoded before B pictures are encoded.

An output signal of the screen re-arranging portion 53 is input to the DCT portion 55 through the subtracting portion 54. The DCT portion 55 performs a DCT encoding process for the signal supplied from the screen re-arranging portion 53. An output signal of the DCT portion 55 is input to the quantizing portion 56. The quantizing portion 56 quantizes the output signal of the DCT portion 55 with a predetermined number of bits. An output signal of the quantizing portion 56 is input to the variable length code encoding portion 57 and the inversely quantizing portion 60. The variable length code encoding portion 57 encodes the output signal of the quantizing portion 56 with variable length codes such as Huffman codes of which data having a higher occurrence rate is assigned a short code. The encoded data is output to the buffer memory 58. The buffer memory 58 outputs the encoded data as output data of the video encoder 11 at a predetermined rate. Since the code amount generated by the variable length code encoding portion 57 is variable, the rate controlling portion 59 monitors the buffer memory 58 and controls the quantizing operation of the quantizing portion 56 so that a predetermined bit rate is kept.

On the other hand, since I pictures and P pictures are used as reference screens by the motion compensating and predicting portion 64, a signal that is input from the quantizing portion 56 to the inversely quantizing portion 60 is inversely quantized and then input to the inverse DCT portion 61. The inverse DCT portion 61 performs the inverse DCT process for the inversely quantized signal. An output signal of the inverse DCT portion 61 and an output signal of the motion compensating and predicting portion 64 are added by the adding portion 62. The added signal is input to the video memory 63. An output signal of the video memory 63 is input to the motion compensating and predicting portion 64. The motion compensating and predicting portion 64 performs a forward prediction, a backward prediction, and a bi-directional prediction for the output signal of the video memory 63. An output signal of the motion compensating and predicting portion 64 is output to the adding portion 62 and the subtracting portion 54. The inversely quantizing portion 60, the inverse DCT portion 61, the adding portion 62, the video memory 63, and the motion compensating and predicting portion 64 compose a local decoding portion that outputs the same decoded video signal as the video decoder 13.

The subtracting portion 54 subtracts the output signal of the screen re-arranging portion 53 from the output signal of the motion compensating and predicting portion 64 and obtains a predictive error between the video signal and the decoded video signal decoded by the local decoding portion. When the intra-frame encoding process is performed (namely, I pictures are supplied), the switch 65 causes the subtracting device 54 not to perform a subtracting process for them. In other words, the I pictures are supplied to the DCT portion 55.

Returning to FIG. 1, when for example MPEG/Audio layer 1/layer 2 is used, the audio encoder 12 further comprises a sub band encoding portion, an adaptive quantizing bit assigning portion, and so forth as electronic circuits. The audio signal is divided into 32 sub band signals by the sub band encoding portion. The 32 sub band signals are quantized corresponding to psychological hearing sense weighting by the adaptive quantizing bit assigning portion. The quantized signal is output as a bit stream.

To improve the encoding quality, MPEG/audio layer 3 is used. In this case, the audio encoder 12 further comprises an adaptive block length modified discrete cosine converting portion, a fold distortion reduction butterfly portion, a non-linear quantizing portion, a variable length code encoding portion, and so forth.

An output signal of the video encoder 11 and an output signal of the audio encoder 12 are supplied to the file generator 15. The file generator 15 converts the video elementary stream and the audio elementary stream into file structures that a computer software program that synchronously reproduces a moving picture, sound, and text can handle without need to use a particular hardware structure. Such a computer software program is for example the forgoing QT. The file generator 15 multiplexes the encoded video data and the encoded audio data. The file generator 15 is controlled by the system controlling microcomputer 19.

A QuickTime movie file that is output from the file generator 15 is successively written to the memory 17 through the memory controller 18. When the system controlling microcomputer 19 requests the memory controller 18 to write data to a record medium 40, the memory controller 18 reads a QuickTime movie file from the memory 17.

In this case, the transfer rate of an encoded QuickTime movie is designated so that it is lower than (for example, ½ of) the transfer rate of data written to the record medium 40.

Thus, although a QuickTime movie file is successively written to the memory 17, a QuickTime movie file is intermittently read from the memory 17 under the control of the system controlling microcomputer 19 so that the memory 17 does not overflow or underflow.

The QuickTime movie file that is read from the memory 17 is supplied from the memory controller 18 to the error correction code encoder/decoder 21. The error correction code encoder/decoder 21 temporarily writes the QuickTime movie file to the memory 20 so as to generate redundant data of interleaved data and error correction codes. The error correction code encoder/decoder 21 reads the redundant data from the memory 20 and supplies the redundant data to the data modulator/demodulator 23.

When digital data is recorded to the record medium 40, the data modulator/demodulator 23 modules the data so that a clock can be easily extracted from the reproduced signal and no inter-code interference takes place. For example (1, 7) RLL (run length limited) codes, Trellis codes, and so forth can be used.

An output signal of the data modulator/demodulator 23 is supplied to the magnetic field modulation driver 24 and the optical pickup 33. The magnetic field modulation driver 24 drives the magnetic field head 32 corresponding to the input signal so as to apply a magnetic field to the record medium 40. The optical pickup 33 radiates a recording laser beam corresponding to the input signal to the record medium 40. In such a manner, data is recorded to the record medium 40.

The record medium 40 is a rewritable optical disc (for example, MO: magneto-optical disc), or a phase change type disc.

According to the first embodiment, an MO, for example, a relatively small disc whose diameter is around 4 cm, 5 cm, 6.5 cm, or 8 cm, is used. The record medium 40 is rotated at constant linear velocity (CLV), constant angular velocity (CAV), or zone CLV (ZCLV) by the motor 31.

The drive controlling microcomputer 22 outputs a signal to the servo circuit 30 corresponding to a request from the system controlling microcomputer 19. The servo circuit 30 controls the motor 31 and the optical pickup 33 corresponding to the output signal of the drive controlling microcomputer 22. As a result, the drive controlling microcomputer 22 controls the entire drive. For example, the servo circuit 30 performs a radius traveling servo operation, a tracking servo operation, and a focus servo operation for the record medium 40 and controls the rotations of the motor 31.

The operating portion 26 is connected to the system controlling microcomputer 19. The user can input a predetermined command to the operating portion 26.

In the reproduction mode, the optical pickup 33 radiates a laser beam having a reproduction output level to the record medium 40. The optical detector of the optical pickup 33 receives the reflected light as a reproduction signal. In this case, the drive controlling microcomputer 22 detects a tracking error and a focus error from an output signal of the optical detector of the optical pickup 33. The servo circuit 30 controls the optical pickup 33 so that the reading laser beam focuses on a predetermined track. In addition, the drive controlling microcomputer 22 controls the traveling in the radius direction of the optical pickup so as to reproduce data at a desired position on the record medium 40. Like the recording mode, the desired position is determined by the system controlling microcomputer 19 in such a manner that the system controlling microcomputer 19 supplies a predetermined signal to the drive controlling microcomputer 22.

A signal reproduced by the optical pickup 33 is supplied to the data modulator/demodulator 23. The data modulator/demodulator 23 demodulates the reproduced signal. The demodulated data is supplied to the error correction code encoder/decoder 21. The reproduced data is temporarily stored in the memory 20. The error correction code encoder/decoder 21 performs a de-interleaving process and an error correcting process for the demodulated data. The QuickTime movie file that has been error corrected is stored to the memory 17 through the memory controller 18.

The QuickTime movie file stored in the memory 17 is output to the file decoder 16 corresponding to a request from the system controlling microcomputer 19. The system controlling microcomputer 19 monitors the data amount of the reproduction signal reproduced from the record medium 40 and stored in the memory 17 and the data amount of the data that is read from the memory 17 and supplied to the file decoder 16 and controls the memory controller 18 and the drive controlling microcomputer 22 so that the memory 17 does not overflow and underflow. In such a manner, the system controlling microcomputer 19 intermittently reads data from the record medium 40.

The file decoder 16 separates the QuickTime movie file into a video elementary stream and an audio elementary stream under the control of the system controlling microcomputer 19. The video elementary stream is supplied to the video decoder 13. The video decoder 13 decodes the video elementary stream that has been compressed and encoded. The decoded video data is output from a video output terminal. The audio elementary stream is supplied to the audio decoder 14. The audio decoder 14 decodes the audio elementary stream that has been compressed and encoded. The decoded audio data is output from an audio output terminal. The file decoder 16 synchronously output the video elementary stream and the audio elementary stream.

When the video decoder 13 corresponds to the MPEG system, the video decoder 13 comprises a buffer memory 71, a variable length code decoding portion 72, an inversely quantizing portion 73, an inverse DCT portion 74, an adding portion 75, a video memory 78, a motion compensating and predicting portion 79, a screen re-arranging portion 76, and a digital/analog converting portion (hereinafter abbreviated as D/A) 77 as electronic circuits. A video elementary stream is temporarily stored in the buffer memory 71. Thereafter, the video elementary stream is input to the variable length code decoding portion 72. The variable length code decoding portion 72 decodes macro block encoded information and separates it into an encoding mode, a moving vector, quantized information, and quantized DCT coefficients. The inversely quantizing portion 73 de-quantizes the quantized DCT coefficients into DCT coefficients. The inverse DCT portion 74 coverts the DCT coefficients into pixel spatial data. The adding portion 75 adds an output signal of the inverse DCT portion 74 and an output signal of the motion compensating and predicting portion 79. However, when an I picture is decoded, the adding portion 75 does not add these output signals. All macro blocks of the screen are decoded. The screen re-arranging portion 76 re-arranges the decoded macro blocks in the original input sequence. The D/A 77 converts the re-arranged data into an analog signal. Since an I picture and a P picture are used as reference screens in the decoding process that follows, they are stored in the video memory 78. The I picture and the P picture are output to the motion compensating and predicting portion 79.

Returning to FIG. 1, when MPEG/Audio layer 1/layer 2 is used, the audio decoder 14 comprises a bit stream disassembling portion, an inversely quantizing portion, and a sub band combining filter bank portion as electronic circuits. An input audio elementary stream is supplied to the bit stream disassembling portion. The bit stream disassembling portion separates the input audio elementary stream into a header, auxiliary information, and a quantized sub band signal. The inversely quantizing portion inversely quantizes the quantized sub band signal by a predetermined number of bits that has been assigned. The sub band combining band filter combines the inversely quantized data and outputs the combined data.

Next, a QuickTime movie file used in such a recording and reproducing apparatus will be described.

FIG. 4 is a schematic diagram showing the structure of a QuickTime movie file.

FIG. 5 is a schematic diagram showing an example of the data structure of a QuickTime movie file.

FIG. 6 is a schematic diagram showing another example of the data structure of a QuickTime movie file.

FIG. 5 and FIG. 6 show coding lists corresponding to a programming language.

Figure 26:
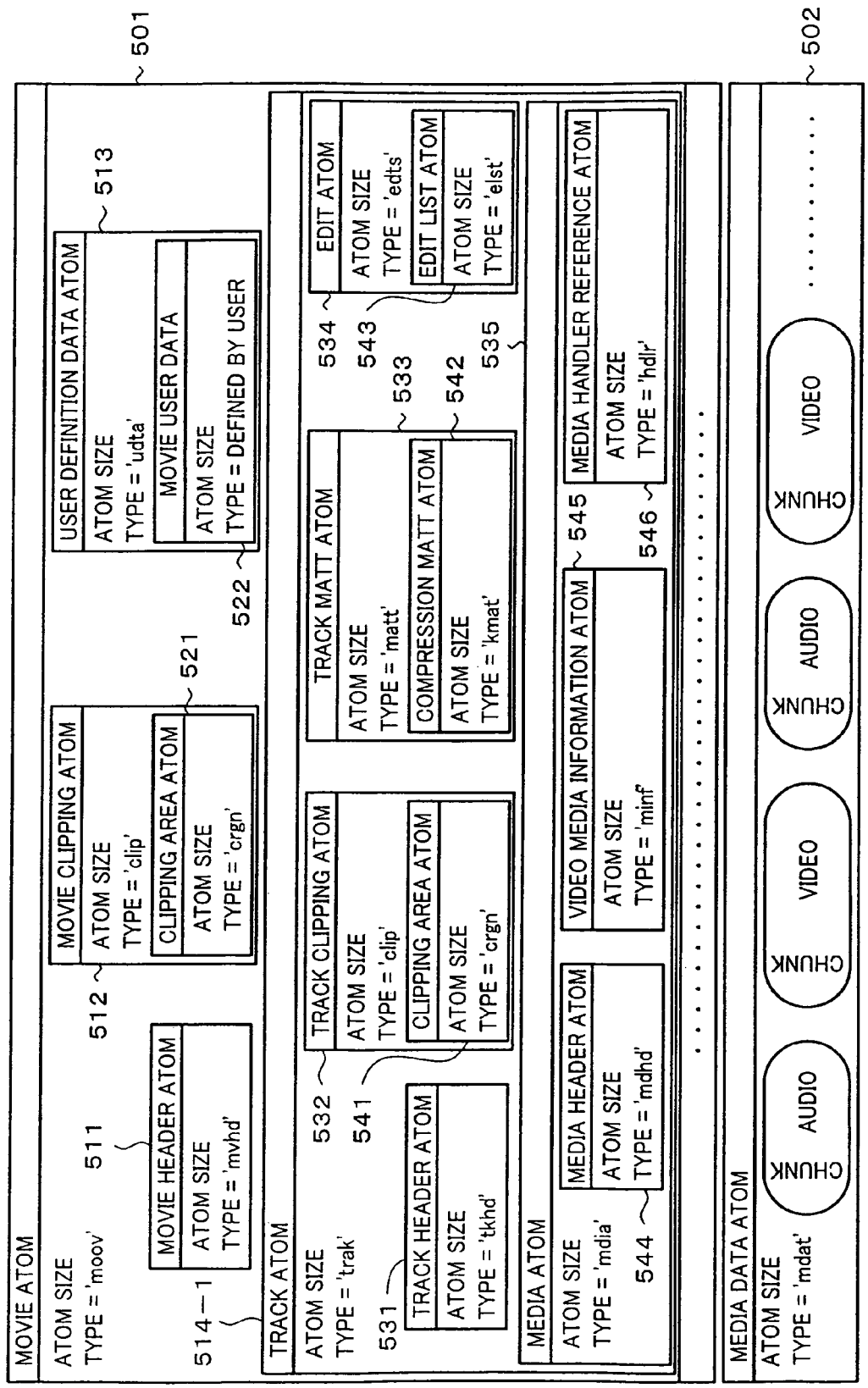
FIG. 26 is a schematic diagram showing an example of the structure of a QuickTime movie file.
Figure 27:
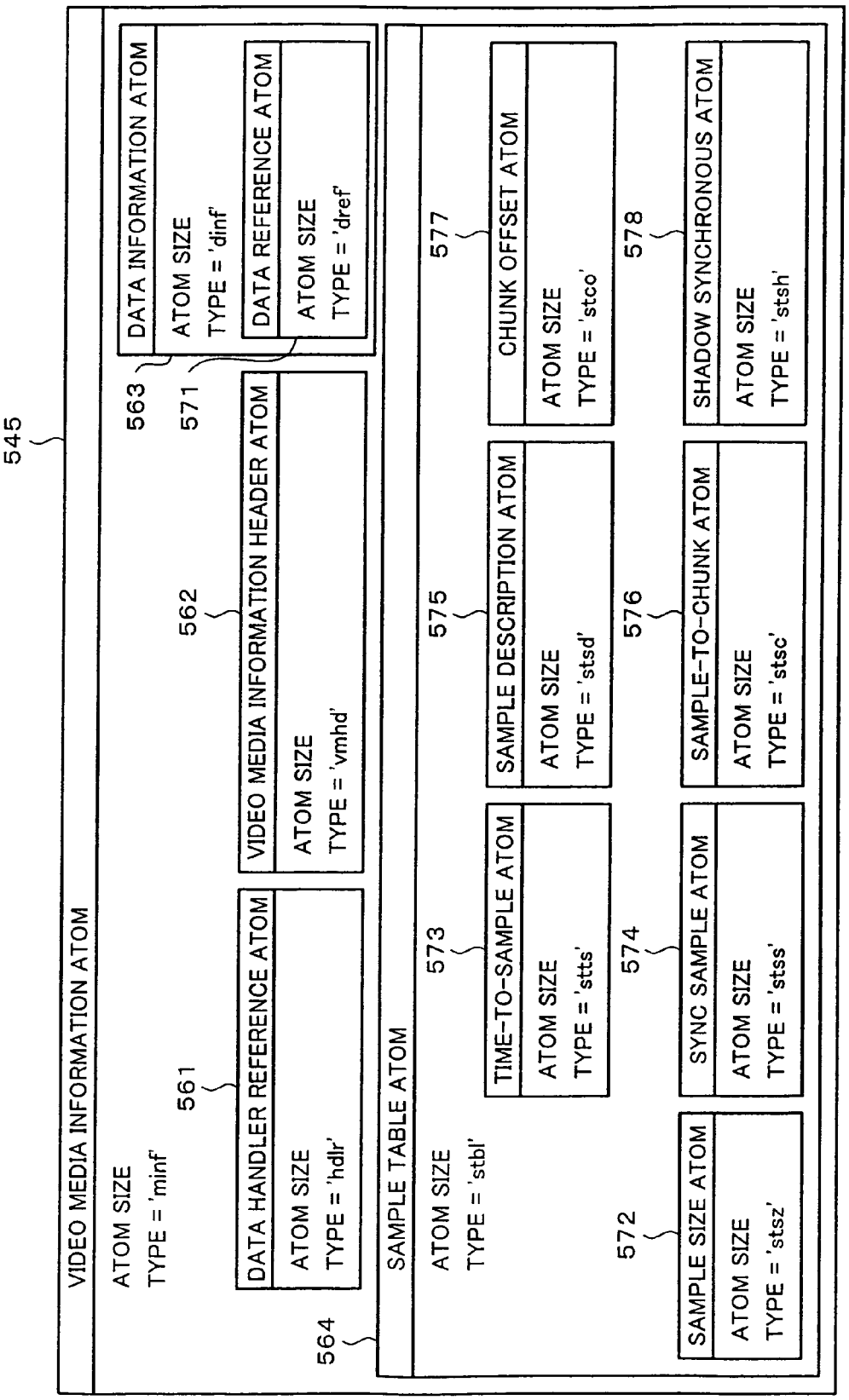
FIG. 27 is a schematic diagram showing an example of the structure of a video media information atom.

In FIG. 4, a QuickTime movie file contains a movie data atom 101, a movie atom 102, and an MQT description atom 103. The movie data atom 101 is an atom that corresponds to the media data atom 502 shown in FIG. 26. The movie data atom 101 contains a video chunk and an audio chunk. The movie atom 102 is an atom that corresponds to the movie atom 501 shown in FIG. 26. The movie atom 102 is a management file for managing the movie data atom 101. The MQT description atom 103 contains information that represents in what unit various types of chunks for example an audio chunk and a video chunk are represented as a successive record length on the record medium 40. The MQT description atom 103 also contains a playback rate of the record medium 40 and a seek time of a drive of the record medium 40.

The MQT description atom 103 contains an interleaved data description atom (hereinafter abbreviated as IDDA) 201 and a set performance atom (hereinafter abbreviated as STPA) 202. According to the first embodiment, the MQT description atom 103 has a type for example "mqbs".

The IDDA 201 contains a track ID, a number-of-entries (hereinafter abbreviated as NOE), and an interleaved data description table (hereinafter abbreviated as IDDT) 211. The IDDA 201 is generated for each track.

The track ID is an identification code with which the IDDA 201 identifies the corresponding track. According to the first embodiment, the IDDA 201 is the corresponding track number. The track ID is assigned four bytes.

The NOE is the number of IDDTs 211. The NOE is assigned four bytes.

The IDDT 211 contains a first chunk, a next track ID, a number-of-recorded-chunks, a number-of-repeats, a duration, and a recorded data size. The IDDT 211 is generated whenever a recorded pattern is changed.

The first chunk is a beginning chunk that is successively recorded in a changed data structure on the record medium 40. According to the first embodiment, the first chunk is represented by the number of the beginning chunk. The first chunk is assigned four bytes.

The next track ID is an identification code that represents a track that is successively recorded against a particular track on the record medium 40. The next track ID also represents a connecting state of tracks in a time series in a successive record length. According to the first embodiment of the present invention, the next track ID is represented by the track ID and assigned four bytes.

According to the first embodiment, the data structure of the successive record length (connecting sequence of tracks in a time series) is represented by the next track ID. However, the data structure of the successive record length may be represented by a track sequence number of the data structure as a position number. For example, in FIG. 7B, the data structure is composed of a first audio track and a second video track. The position numbers of these tracks may be represented by "1", "2", and so on.

The number-of-recorded-chunks is the number of chunks successively recorded on a designated track of the record medium 40. The number-of-recorded-chunks is assigned two bytes.

The number-of-repeats is the number of times of which a combination of chunks on a designated track is repeatedly recorded on the record medium 40. In other words, the number-of-repeats is the number of times of which chunks of the same track that are successively recorded are repeated after data of different tracks that are interleaved. The number-of-repeats is assigned one byte.

The duration is a time length of data of a track successively recorded. The duration is assigned four bytes.

The recorded data size is the data size of the same type of tracks. In particular, the recorded data size is used to determine whether or not data that has been edited can be successively reproduced. The recorded data size has three types that are the maximum recorded data size, the minimum recorded data size, and the average recorded data size of four bytes each. When necessary, they are contained in the IDDT 201. In other words, there are eight cases: (1) the IDDT 201 contains the maximum recorded data size, the minimum recorded data size, and the average recorded data size, (2) the IDDT 201 contains the maximum recorded data size and the average recorded data size, (3) the IDDT 201 contains the minimum recorded data size the average recorded data size, (4) the IDDT 201 contains the maximum recorded data size and the minimum recorded data size, (5) the IDDT 201 contains the maximum recorded data size, (6) the IDDT 201 contains the minimum recorded data size, (7) the IDDT 201 contains the average recorded data size, and (8) the IDDT 201 does not contain the maximum recorded data size, the minimum recorded data size, and the average recorded data size. When the track data size is not changed, as with the cases (1) to (7), at least one of the maximum recorded data size, the minimum recorded data size, and the average recorded data size is described to the IDDA 201 with the same value. Alternatively, one of them is described as the recorded data size. Although there are many cases, to determine whether or not data that has been edited can be successively reproduced, at least one of values of the recorded data size is described to the IDDT 211 or IDDA 201.

FIG. 5 shows the case that the maximum recorded data size, the minimum recorded data size, and the average recorded data size are described in the IDDT 211. FIG. 6 shows the case that the maximum recorded data size, the minimum recorded data size, and the average recorded data size are described in the IDDA 201.

According to the first embodiment, the data size contained in the successive record length is represented by its value. Alternatively, the recorded data size may be used.

The STPA 202 contains a seek time of two bytes and a playback rate (bps) of two bytes. These values are described in the STPA 202.

The size of the duration depends on the easiness of the editing operation, the seek time, and the playback rate. The easiness of the editing operation is reversely proportional to the value of the duration. However, when the value of the duration is too small, the sum of the seek time and the playback time (the number of bits that are read/playback rate) becomes larger than the data playback time of the successive record length. As a result, it becomes difficult to successively reproduce a movie.

In the forgoing description, although assigned bytes are represented as practical values, they are just examples. In other words, they are assigned corresponding to the values of the individual fields.

In such a manner, the MQT description atom 103 contains information that represents what chunks of what tracks have been successively recorded as a set in what quantity unit on the record medium 40. In other words, according to the first embodiment, management information for data contained in the successive record length and information that depends on a recording apparatus such as a drive are contained as a block in the MQT description atom 103.

When the recording and reproducing apparatus reproduces a QuickTime movie file, the apparatus references the MQT description atom 103, determines the recorded state of the real data on the record medium 40, reads a block of data that has been successively recorded, and determines whether or not while the apparatus is reproducing the data that has been read, it can read the next block of data. As a result, the apparatus can determine whether or not it can successively reproduce the data.

When real data recorded on the record medium 40 is edited, by referencing the MQT description atom 103, the recording and reproducing apparatus can determine whether or not it can successively reproduce the data in the structure of which the data has been edited.

When the determined result represents that the apparatus cannot successively reproduce the data, it is preferred that the apparatus issues an alarm thereabout.

When a recording and reproducing apparatus that has recorded real data to the record medium 40 is different from a recording and reproducing apparatus that reproduces the real data or when a recording and reproducing apparatus that has recorded real data to the record medium 40 is different from a recording and reproducing apparatus that edits the real data, the MQT description atom 103 is especially useful.

In addition, since such information is collectively described in the MQT description atom 103, it can be clearly distinguished from the movie atom 102 that descries a logical structure. In particular, even if a recording and reproducing apparatus cannot recognize the MQT description atom 103, when the apparatus ignores it, the apparatus can reproduce a QuickTime movie file.

In addition, according to the first embodiment, the MQT description atom 103 is placed at the highest hierarchical level of the data structure. Alternatively, information contained in the MQT description atom 103 may be placed in a higher hierarchical level than the movie atom 102. In particular, since information is collected without tracing the hierarchy, it is preferred to place information contained in the MQT description atom 103 in the highest hierarchical level.

Next, a process for which the digital recording and reproducing apparatus interprets a data structure of data successively recorded on the record medium 40 with information contained in the MQT description atom 103 will be described using a more practical example.

First Example

Figures 7A, 7B:
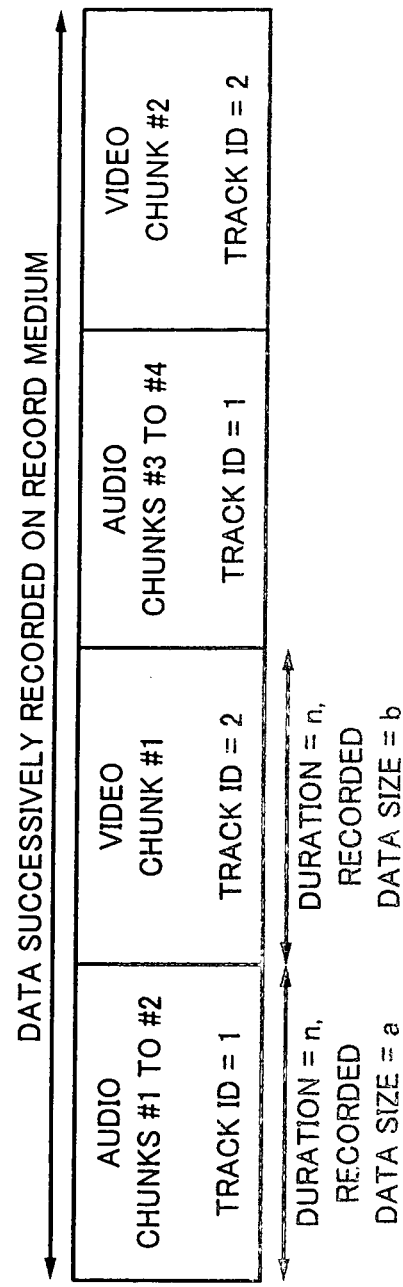
FIG. 7A is a schematic diagram showing an interleaved data description table according to a first example of the present invention.
FIG. 7B is a schematic diagram showing data successively recorded on a record medium according to the first example of the present invention.

FIG. 7 shows an interleaved data description table and data successively recorded on a record medium according to a first example of the present invention. FIG. 7A shows the interleaved data description table. FIG. 7B shows the data successively recoded on the record medium.

In FIG. 7A, the IDDT 211 contains the following values for an audio track.
First chunk=1
Next track ID=2
Number of recorded chunks=2
Number of repeats=2
Duration=n (where n=any positive integer)
Maximum recorded data size=a (where a is any positive integer)
Minimum recorded data size=a
Average recorded data size=a
The IDDT 211 contains the following values for a video track.
First chunk=1
Next track ID=0
Number of recorded chunks=1
Number of repeats=2
Duration=n
Maximum recorded data size=b (where b is any positive integer)
Minimum recorded data size=b
Average recorded data size=b When the MQT description atom 103 contains the forgoing values, the system controlling microcomputer 19 of the digital recording and reproducing apparatus determines a data structure of data successively recorded on the record medium 40 in the following manner.

First of all, since the first chunk is 1, the system controlling microcomputer 19 determines that the beginning chunk of audio of track ID=1 is chunk #1. Since the first chunk is 1, the system controlling microcomputer 19 determines that the beginning chunk of video of track ID=2 is chunk #1.

Next, since the number of recorded chunks is 2, the system controlling microcomputer 19 determines that audio of track ID=1 is two successive chunks. Since the number of recorded chunks is 1, the system controlling microcomputer 19 determines that video of track ID=2 is one chunk.

Next, since the next track ID is 2, the system controlling microcomputer 19 determines that audio of track ID=1 is followed by track ID=2 (namely, video of track ID=2). Since the next track ID is 0, the system controlling microcomputer 19 determines that video of track ID=2 is not followed by any new track.

Next, since the number of repeats is 2, the system controlling microcomputer 19 determines that audio of track ID=1 is repeated two times in the same recorded state. Since the number of repeats is 2, the system controlling microcomputer 19 determines that video of track ID=2 is repeated two times in the same recorded state.

Next, since the duration is n (where n is any positive integer), the maximum recorded data size is a (where a is any positive integer), the minimum recorded data size is a, and the average recorded data size is a, the system controlling microcomputer 19 determines that the time length of data of audio of track ID=1 is n and that the data size is a as a fixed value. Since the duration is n, the maximum recorded data size is b (where b is any positive integer), the minimum recorded data size is b, and the average recorded data size is b, the system controlling microcomputer 19 determines that the time length of data of video of track ID=2 is n and that the data size is b as a fixed value.

In such a manner, the system controlling microcomputer 19 determines that the data structure of data successively recorded on the record medium 40 is as shown in FIG. 7B.

Second Example

Figures 8A, 8B:
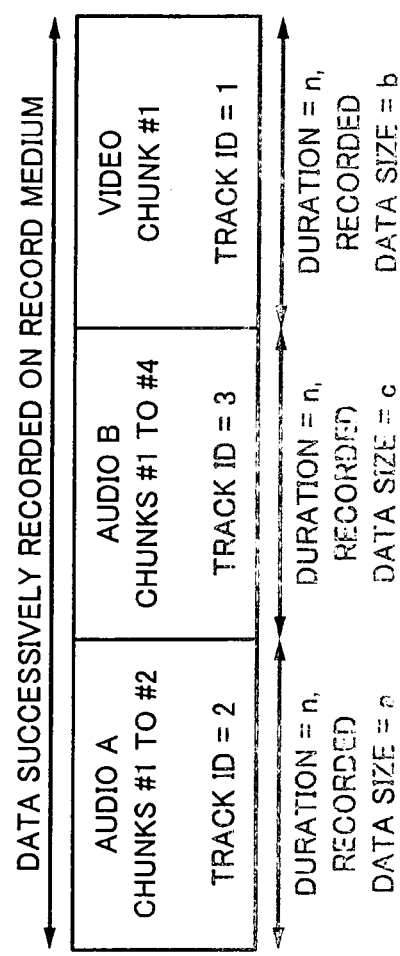
FIG. 8A is a schematic diagram showing an interleaved data description table according to a second example of the present invention.
FIG. 8B is a schematic diagram showing data successively recorded on a record medium according to the second example of the present invention.

FIG. 8 is a schematic diagram showing an interleaved data description table and data successively recorded on a record medium according to a second example of the present invention. FIG. 8A shows the interleaved data description table. FIG. 8B shows the data successively recorded on the record medium.

In FIG. 8A, the IDDT 211 contains the following values for an audio track.
First chunk=1
Next track ID=3
Number of recorded chunks=2
Number of repeats=1
Duration=n
Maximum recorded data size=a
Minimum recorded data size=a
Average recorded data size=a
The IDDT 211 contains the following values for an audio track.
First chunk=1
Next track ID=1
Number of recorded chunks=4
Number of repeats=1
Duration=n
Maximum recorded data size=c (where c is any positive integer)
Minimum recorded data size=c
Average recorded data size=c
The IDDT 211 contains the following values for a video track.
First chunk=1
Next track ID=0
Number of recorded chunks=1
Number of repeats=1
Duration=n
Maximum recorded data size=b
Minimum recorded data size=b
Average recorded data size=b When the MQT description atom 103 contains the forgoing values, with each "first chunk", the system controlling microcomputer 19 determines that the beginning chunk of audio of track ID=2 is chunk #1, that the beginning chunk of audio of track ID=3 is chunk #1, and that the beginning chunk of video of track ID=1 is chuck #1.

Next, with each "number of recorded chunks", the system controlling microcomputer 19 determines that audio of track ID=2 is two successive chunks, that audio of track ID=3 is four successive chunks, and that video of track ID=1 is one chunk.

Next, with each "next track ID", the system controlling microcomputer 19 determines that audio of track ID=2 is followed by audio of track ID=3, that audio of track ID=3 is followed by audio of ID=1, and that video of track ID=1 is not followed by any new track.

Next, with each "number of repeats", the system controlling microcomputer 19 determines that audio of track ID=2 is repeated one time in the same recorded state, that audio of track ID=3 is repeated one time in the same recorded state, and that video of track ID=1 is repeated one time in the same recorded state.

Next, with each "duration", each "maximum recorded data size", each "minimum recorded data size", and each "average recorded data size", the system controlling microcomputer 19 determines that the time length of data of audio of track ID=2 is n, that the data size is a as a fixed value, that the time length of data of audio of track ID=3 is n, that the data size is c as a fixed value (where c is any positive integer), that the time length of data of video of track ID=1 is n, and that the data size is b as a fixed value.

In such a manner, the system controlling microcomputer 19 determines that the data structure of data successively recorded on the record medium 40 is as shown in FIG. 8B.

Next, with reference to FIG. 8B, the case that a part of tracks is reserved for an area that is after-recorded will be described.

In the data structure of the successive record length shown in FIG. 8B, for example audio track (Audio B) of track ID=3 is reserved for an area that is after-recorded. In other words, original audio data that is input from an audio input is recorded on audio track (Audio A) of track ID=2. Original video data that is input from a video input is recorded on video track (Video) of track ID=1. At that point, audio track (Audio B) of track ID=3 is allocated as a reserve area for any data on the record medium 40. For example, blank data (all bits are zero) corresponding to audio A data is recorded as a reserved area. Alternatively, when video data of track ID=1 is recorded, an offset for bytes corresponding to audio A is allocated. As a result, an area from the record end position of audio A data to the offset is allocated as a reserved area.

When audio data is after-recorded in a movie recorded in such a data structure, the audio data is recorded in the reserved area (namely, track ID=3).

In such a manner, when data is recorded, a reserved area is allocated in a successive record length of the record medium 40. As a result, when data is recorded on a record medium on which another data has been recorded, the reserved area can be used. Using the reserved area, post-recorded data can be reproduced in synchronization with pre-recorded data. In addition, since a reserved are is allocated in the successive record length, post-recorded data can be easily and successively reproduced.

For example, when audio data is after-recorded as audio B on track ID=3, the recording and reproducing apparatus can synchronously reproduce the after-recorded audio data and video data. Since related video chunks and after-recorded audio chunks are physically successively recorded, no track jump takes place. Thus, a movie that has been after-recorded can be reproduced without a break.

To determine what track is for original data (that has been originally recorded on the record medium 40) and what track is for a reserved area for after-recorded data (that is post-recorded on the record medium 40), as shown in FIGS. 5 and 6, a flag is provided for the interleaved data description atom. For example, when the first bit (LSB) of the flag is "0", it represents that the corresponding track is a track for original data. When the first bit of the flag is "1", it represents that the corresponding track is a track for after-recorded data. In addition, to represent whether or not data has been recorded in the reserved area, for example the second bit of the flag is used. When the second bit is "0", it represents that the reserved area has not been used (namely, data has not been after-recorded). When the second bit of the flag is "1", it represents that the reserved area has been used (namely, data has been after-recorded). With reference to the flag, the recording and reproducing apparatus can determine track ID=2 or track ID=3 from which audio data should be reproduced with priority. In addition, after data has been recorded to the reserved area, when the data is erased therefrom, with reference to the flag, the recording and reproducing apparatus can easily determine the reserved area from which audio data should be erased.

Alternatively, a new field that identifies a reserved area (for example, an attribute field) may be disposed in the interleaved data description atom or interleaved data description atom. Attributes such as identification of original audio/original video, state identification of reserved area not recorded/reserved area recorded, after-recorded audio, second foreign language audio, multi-angle video and reproduction priority can be described in the attribute field.

In addition to the methods using such a flag and field, when data is recorded, track IDs may be designated. For example, track ID=1 is designated original data, whereas track ID=2 is designated after-recorded data. Alternatively, track ID=1 is designated original audio, track ID=2 is designated original video, track ID=3 is designated after-recorded audio, track ID=4 to n are designated second foreign language audio, track ID=i to k are designated multi-angle video (where n, i, and k are any integers, 4<n<i<k). In this case, the reproduction priority is reversely proportion to the track ID value. In such a case, to determine whether the reserved area is blank or full, the enable flag of the field format of QT may be used.

Next, examples of which the data structure of the successive record length is changed (namely, the data structure of the successive record length is changed while data is being recorded and the data structure of the successive record length is changed after data is edited) will be described.

Third Example

FIG. 9 is a schematic diagram showing an interleaved data description table according to a third example of the present invention.

FIG. 10 is a schematic diagram showing data successively recorded on a record medium according to the third example of the present invention.

According to the third example of the present invention, an IDDT 211 is changed from a table shown in FIG. 9A to a table shown in FIG. 9B and then to a table shown in FIG. 9C.

In FIG. 9A, an IDDT 211-11 contains the following values for an audio track.

First chunk=1
Next track ID=2
Number of recorded chunks=2
Number of repeats=2
Duration=n
Maximum recorded data size=a
Minimum recorded data size=a
Average recorded data size=a An IDDT 211-21 contains the following values for a video track.

First chunk=1
Next track ID=0
Number of recorded chunks=1
Number of repeats=2
Duration=n
Maximum recorded data size=b
Minimum recorded data size=b
Average recorded data size=b With these values, the system controlling microcomputer 19 determines that audio of track ID=1 starts with chunk #1 and that video of track ID=2 is successive for two chunks. The system controlling microcomputer 19 determines that video of track ID=2 starts with chunk #1 and is not followed by any new track. Next, the system controlling microcomputer 19 determines that audio of ID=1 is repeated two times in the same recorded state and that video of track ID=2 is repeated two times in the same recorded state. In addition, the system controlling microcomputer 19 determines that the time length of data of audio of track ID=1 is n, that the data size is a as a fixed value, and that the time length of data of video of track ID=1 is n, and that the data size is b as a fixed value.

As a result, the system controlling microcomputer 19 determines that the data structure of data successively recorded on the record medium 40 is as shown in FIG. 10A".

When audio of track ID=1 is changed from a data structure of which a successive record length containing chuck=k (where k is any positive integer) to a data structure of which the number of samples of the chunk is doubled, an IDDT 211-12 is added to the IDDT 211-11. FIG. 9B shows the IDDT 211-12. In FIG. 9B, the IDDT 211-12 contains the following values for an audio track.

First chunk=k
Next track ID=2
Number of recorded chunks=1
Number of repeats=2
Duration=n
Maximum recorded data size=a
Minimum recorded data size=a
Average recorded data size=a Since successive chunks are collected to one chunk, number of recorded chunk=1, the number of recorded chunks becomes 1. However, the value of "duration" and each value of "recorded data size" are not changed. Since video of track ID=2 is not changed, no table is added.

FIG. 10B" shows a data structure corresponding to the table shown in FIG. 9B.

In addition, audio of track ID=1 is changed from a data structure of a successive record length containing chunk=m (where m is any positive integer) to a data structure of which the number of samples of the chunk is halved, the duration is doubled, and the recorded data size is doubled. In addition, video of track ID=2 is changed from a data structure of a successive record length containing chunk=j (where j is any positive integer) to a data structure of which the duration is doubled and the recorded data size is doubled. When the recorded sequence of audio ad video is changed, an IDDT 211-13 for audio is added to the IDDT 211-12. In addition, an IDDT 211-22 for video is added to the IDDT 211-21. FIG. 9C shows the IDDT 211-13 and the IDDT 211-22. In FIG. 9C, the IDDT 211-13 contains the following values for an audio track.

First chunk=m
Next track ID=0
Number of recorded chunks=2
Number of repeats=2
Duration=2×n
Maximum recorded data size=2×a
Minimum recorded data size=2×a
Average recorded data size=2×a The IDDT 211-22 contains the following values for a video track.

First chunk=j
Next track ID=1
Number of recorded chunks=2
Number of repeats=1
Duration=2×n
Maximum recorded data size=2×b
Minimum recorded data size=2×b
Average recorded data size=2×b In this example, since a data structure has been changed so that video is followed by audio, the next track ID for audio becomes 0 and the next track ID for video becomes 1.

FIG. 10C" shows the data structure corresponding to the table shown in FIG. 9C.

Fourth Example

FIG. 11 shows an interleaved data description table according to a fourth example of the present invention.

FIG. 12 is a schematic diagram showing data successively recoded on a record medium according to the fourth example of the present invention.

An IDDT 211 according to the fourth example of the present invention is changed from a table shown in FIG. 11A to a table shown in FIG. 11B and then to a table shown in FIG. 11C.

In FIG. 11A, an IDDT 211-11 contains the following values for an audio track.

First chunk=1
Next track ID=2
Number of recorded chunks=2
Number of repeats=2
Duration=n
Maximum recorded data size=a
Minimum recorded data size=a
Average recorded data size=a An IDDT 211-21 contains the following values for a video track.

First chunk=1
Next track ID=0
Number of recorded chunks=1
Number of repeats=2
Duration=n
Maximum recorded data size=b
Minimum recorded data size=b
Average recorded data size=b With these values, the system controlling microcomputer 19 determines that audio of track ID=1 starts with chunk #1, that two chunks are successive, and that audio of track ID=1 is followed by video of track ID=2. The system controlling microcomputer 19 determines that video of track ID=2 starts with chunk #1, that the number of recorded chunks is one, and that video of track ID=2 is not followed by any new track. The system controlling microcomputer 19 determines that audio of track ID=1 is repeated two times in the same recorded state and that video of track ID=2 is repeated two times in the same recorded state. In addition, the system controlling microcomputer 19 determines that the time length of data of audio of track ID=1 is n, that the data size is a as a fixed value, that data of video of track ID=1 is n, and that the data size is b as a fixed value.

As a result, the system controlling microcomputer 19 determines that the data structure of data successively recorded on the record medium 40 is as shown in FIG. 12A".

When audio of track ID=1 is changed from a data structure of a successive record length containing chunk=k to a data structure of which the recorded data size is variable, an IDDT 211-12 is added to the IDDT 211-11. FIG. 11B shows the IDDT 211-12. In FIG. 11B, the IDDT 211-12 contains the following values for an audio track.

First chunk=k
Next track ID=2
Number of recorded chunks=2
Number of repeats=2
Duration=n
Maximum recorded data size=x (where x is any positive integer)
Minimum recorded data size=y (where y is any positive integer)
Average recorded data size=z (where z is any positive integer)

Since the data structure is not changed, the values of "next track ID", "number of recorded chunks", "number of repeats", and "duration" are not varied. Since data is recorded in a variable length, the values of "maximum recorded data size", "minimum recorded data size", and "average recorded data size" may be different from each other. Since video of track ID=2 is not changed, no table is added.

FIG. 12B" shows a data structure corresponding to the tale shown in FIG. 11B.

When audio of track ID=1 is changed from a data structure of a successive record length containing chunk=m (where m is any positive integer) to a data structure of which the number of samples of the chunk is changed, the duration is changed. When video of track ID=2 is changed from a data structure of a successive record length containing chunk=j (where j is any positive integer) to a data structure of which the number of samples of the chunk is changed, the duration is changed. In this case, an IDDT 211-13 for audio is added to the IDDT 211-12. An IDDT 211-22 for video is added to the IDDT 211-21. FIG. 11C shows the IDDT 211-13 and the IDDT 211-22. In FIG. 11C, the IDDT 211-13 contains the following values for an audio track.

First chunk=m
Next track ID=2
Number of recorded chunks=2
Number of repeats=2
Duration=n' (where n' is any positive integer)
Maximum recorded data size=x' (where x' is any positive integer)
Minimum recorded data size=y' (where y' is any positive integer)
Average recorded data size=z' (where z' is any positive integer)

The IDDT 211-22 contains the following values for a video track.

First chunk=j
Next track ID=0
Number of recorded chunks 1
Number of repeats=2
Duration=n'
Maximum recorded data size=b' (where b' is any positive integer)
Minimum recorded data size=b'
Average recorded data size=b'

FIG. 12C" shows a data structure corresponding to the table shown in FIG. 11C.

In the first to fourth examples, the process for interpreting the data structure of data recorded on the record medium 40 with information contained in the MQT description atom 103 was described. Of course, when data is recorded in such a data structure on the record medium 40, the recording and reproducing apparatus generates the MQT description atoms corresponding to the first to fourth examples of the present invention.

Next, the relation between a QuickTime movie file and a recorded state on the record medium 40 will be described.

Figure 13:
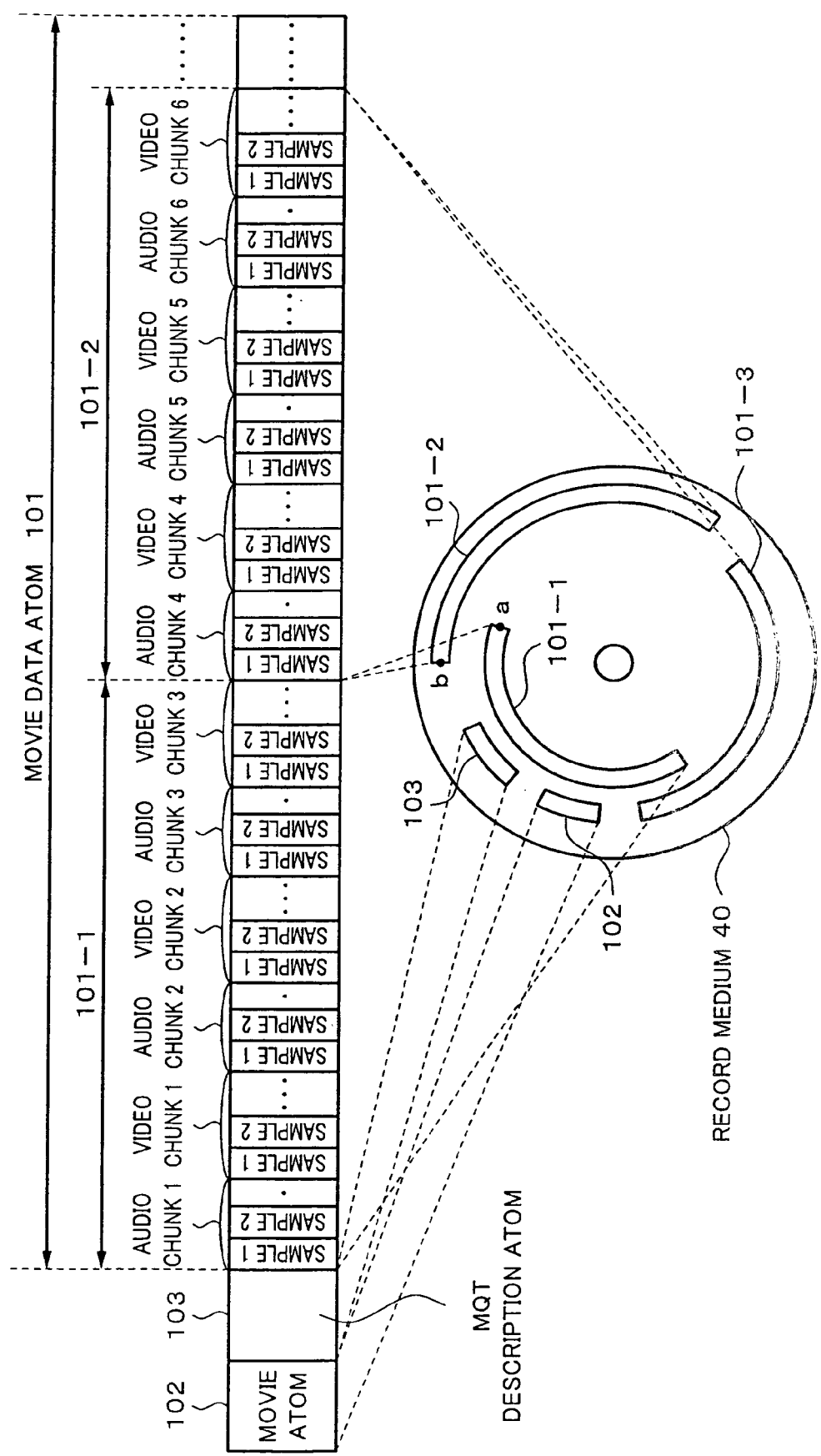
FIG. 13 is a schematic diagram showing the relation between a QuickTime movie file and a recorded state on a record medium 40.

FIG. 13 is a schematic diagram showing the relation between a QuickTime movie file and a recorded state on the record medium 40.

In FIG. 13, one video decode unit composes one sample of a QuickTime file format. One video decode unit is composed of a sequence header (SH) and GOP corresponding to the MPEG system. Two samples that are chronologically successive compose one video chunk. One video chunk corresponds to one second. Alternatively, one sample may be composed of six GOPs. One video chunk may be composed of one sample. Likewise, one audio decode unit composes one sample of a QuickTime file format. 42 samples that are chronologically successive compose one audio chunk. Assuming that the sampling frequency is 48 kH, one audio chunk corresponds to around one second.

As was described above, a QuickTime movie file is largely divided into a movie data atom 101, a movie atom 102, and an MQT description atom 103. When a QuickTime movie file is recorded on the record medium 40, a plurality of chunks each of which is composed of the movie atom 102, the MQT description atom 103, and the movie data atom 101 is correlated with the successive record length. The successive record length is a length of which chunks can be written to successive addresses in one access operation of the optical pickup 33 (namely, without need to perform a jumping operation of the optical pickup 33). When video chunks and audio chunks have been multiplexed, a plurality of sets of audio chunks and video chunks that correspond in movie data are correlated with the successive record length.

As shown in FIG. 13, one or a plurality of chunks may be contained as the successive record length. The positions of the successive record lengths on the record medium 40 (for example, an optical disc) are physically non-successive. Thus, after data of one successive record length is reproduced, when data of the next successive record length is reproduced, a track jump takes place. For example, after successive record length data 101-1 is reproduced, when successive record length data 101-2 is reproduced, a track jump takes place from point a to point b on the record medium 40. Thus, to successively reproduce the successive record length data 101-1 and the successive record length data 101-2, it is necessary to travel the optical pickup from point a to point b and read the successive record length data 101-2 while the apparatus is reproducing the successive record length data 101-1.

In other words, it is necessary to satisfy the equation (1).

$$Td Ts + Lb/Tr \qquad \text{Equation (1)}$$

where Td is the time length of the successive record length data; Lb is the number of bits of the successive record length data; Ts is the seek time; and Tr is the playback rate.

In reality, considering margin Tm due to the fabrication fluctuation of the reading apparatus, the equation (2) should be satisfied.

$$Td Ts + Lb/Tr + Tm \qquad \text{Equation (2)}$$

To determine whether or not the equation (2) (or equation (1)) is satisfied, the system controlling microcomputer 19 can use information contained in the MQT description atom 103. In other words, the system controlling microcomputer 19 calculates the time length Td of the successive record length and the number of bits Lb of the successive record length with information contained in the IDDA 201. In addition, the system controlling microcomputer 19 calculates the seek time Ts and the playback time Lb/Tr with information contained in the set performance atom 202. Corresponding to the calculated results, the system controlling microcomputer 19 can determine whether or not the equation (2) (or the equation (1)) is satisfied.

In particular, when data of the movie data atom 101 that has been recorded on the record medium 40 is edited, the system controlling microcomputer 19 can determine whether or not that data that has been edited can be successively reproduced in the data structure of the data that has been edited with information contained in the MQT description atom 103. Since the MQT description atom 103 contains values of "maximum recorded data size", "minimum recorded data size", and "average recorded data size", the satisfying limitation of the equation (2) (or the equation (1)) can be calculated with them. The apparatus can determine whether or not data that is edited can be successively reproduced in the data structure that is edited without need to collect information from the sample description table of the movie atom 102. Thus, the time necessary for determining whether or not data that is edited can be successively reproduced in the data structure of the data that is edited using the MQT description atom 103 is shorter than that with the sample description table.

For reference, as an undisclosed technology filed as Japanese Patent Application No. 11-356037, a process for calculating the time length and data length of a successive record length as a block with the sample description table contained in the movie atom will be described. According to the technology filed as Japanese Patent Application No. 11-356037, by additionally defining a field group in the sample description table, information such as the relation of tracks on which data is successively recorded and the number of chunks in the successive record length can be contained.

The time length of the successive record length is calculated for example in the following manner.

Firstly, corresponding to the field group additionally defined in the sample description table, the beginning of audio of any successive record length and the beginning chunk number of the next successive record length (chunk(h), chunk(h+4)) are obtained.

Secondly, corresponding to the sample-to-chunk atom 576, the beginning sample number (sample (h-first)) in chunk (h) is obtained.

Thirdly, corresponding to the sample-to-chunk atom 576, the beginning sample number (sample (h+4-first)) in chunk (h+4) is obtained.

Fourthly, corresponding to the time-to-sample atom 573, the time unit (tu (h-first)) of sample (h-first) is obtained.

Fifthly, corresponding to the time-to-sample atom 573, the time unit (tu (h+4-first)) of sample (h+4-first) is obtained.

Sixthly, the time unit of audio of the successive record length is calculated with tu (h-first) and tu (h+4-first).

Seventhly, the real time length is calculated with the time scale of the media header atom 544.

On the other hand, the data length of the successive record length is calculated for example in the following manner.

Firstly, corresponding to the field group additionally defined in the sample description table, the beginning chunk number (chunk (h)) of the track of the next successive record length against any forgoing successive record length is obtained.

Secondly, corresponding to the field group additionally defined in the sample description table, the beginning chunk number (chunk (h+4)) of the track of the next successive record length against any forgoing successive record length is obtained.

Thirdly, corresponding to the chunk offset atom 577, since the chunk offset (ad (h)) of chunk (h) is the beginning logical address of the successive record length, the chunk offset (ad (h)) is obtained.

Fourthly, corresponding to the chunk offset atom 577, since the chunk offset of chunk (h+4) is the beginning logical address-(ad (h+4)) of the successive record length, the chunk offset (ad (h+4)) is obtained.

Fifthly, the data length is calculated with ad (h) and ad (h+4).

In the forgoing manner, the time length and data length of the successive record length are calculated. However, since they should be calculated for each track, a huge number of calculations are required.

On the other hand, as was described above, with the MQT description atom, a huge number of calculations can be suppressed.

Since the MQT description table is provided, a first type recording and reproducing apparatus can edit data that has been recorded on a record medium 40 by a second type recording and reproducing apparatus so that the second type recording and reproducing apparatus can easily and successively reproduce the data edited by the first type recording and reproducing apparatus. For example, a personal computer can edit data that has been recorded by a video camera so that the video camera can successively reproduce the data edited by the personal computer.

In addition, since information of a chunk whose data structure has been changed is contained as a first chunk, as shown in the third example and the fourth example, the data structure can be flexibly changed.

According to the first embodiment, a digital recording and reproducing apparatus is disposed in a portable camera-integrated disc recoding and reproducing apparatus. However, the present invention is not limited to such an apparatus. The digital recording and reproducing apparatus according to the present invention can be used as a single apparatus (not integrated with a camera). In addition, the digital recording and reproducing apparatus can be disposed in a computer on which an QuickTime application software program runs. In addition, the present invention can be applied to the case that both video data and audio data are handled, the case that only video data is handled, the case that only audio data is handled, and the case that text data, MIDI, or the like is handled.

In addition, according to the first embodiment of the present invention, as an example of an audio compressing and encoding system, the MPEG/Audio system was described. However, it should be noted that the present invention is not limited to such a system. For example, as another example of a compressing and encoding system, ATRAC (Adaptive Transform Acoustic Coding) system that has been used for mini disc may be used.

In addition, according to the first embodiment of the present invention, an atom that contains management information for data contained in a successive record length and information such as a playback rate and a seek time that depend on the recording apparatus was named an MQT description atom. Fields of individual types of information were named first chunk, next track ID, and so forth as was described above. However, the present invention is not limited to them. For example, the MQT description atom may be named an HITY atom or the like.

Second Embodiment

A second embodiment of the present invention is the same as the first embodiment in that the movie data atom 101 and the movie atom 102 are provided. However, according to the second embodiment, to flexibly handle the relation among pieces of data, an MQT description atom 113 is used as an extended version of the MQT description atom 103.

Next, the MQT description atom 113 according to the second embodiment will be described. Since the structure of the digital recording and reproducing apparatus according to the second embodiment is the same as those shown in FIGS. 1 and 3, the description thereof will be omitted.

Figure 14:
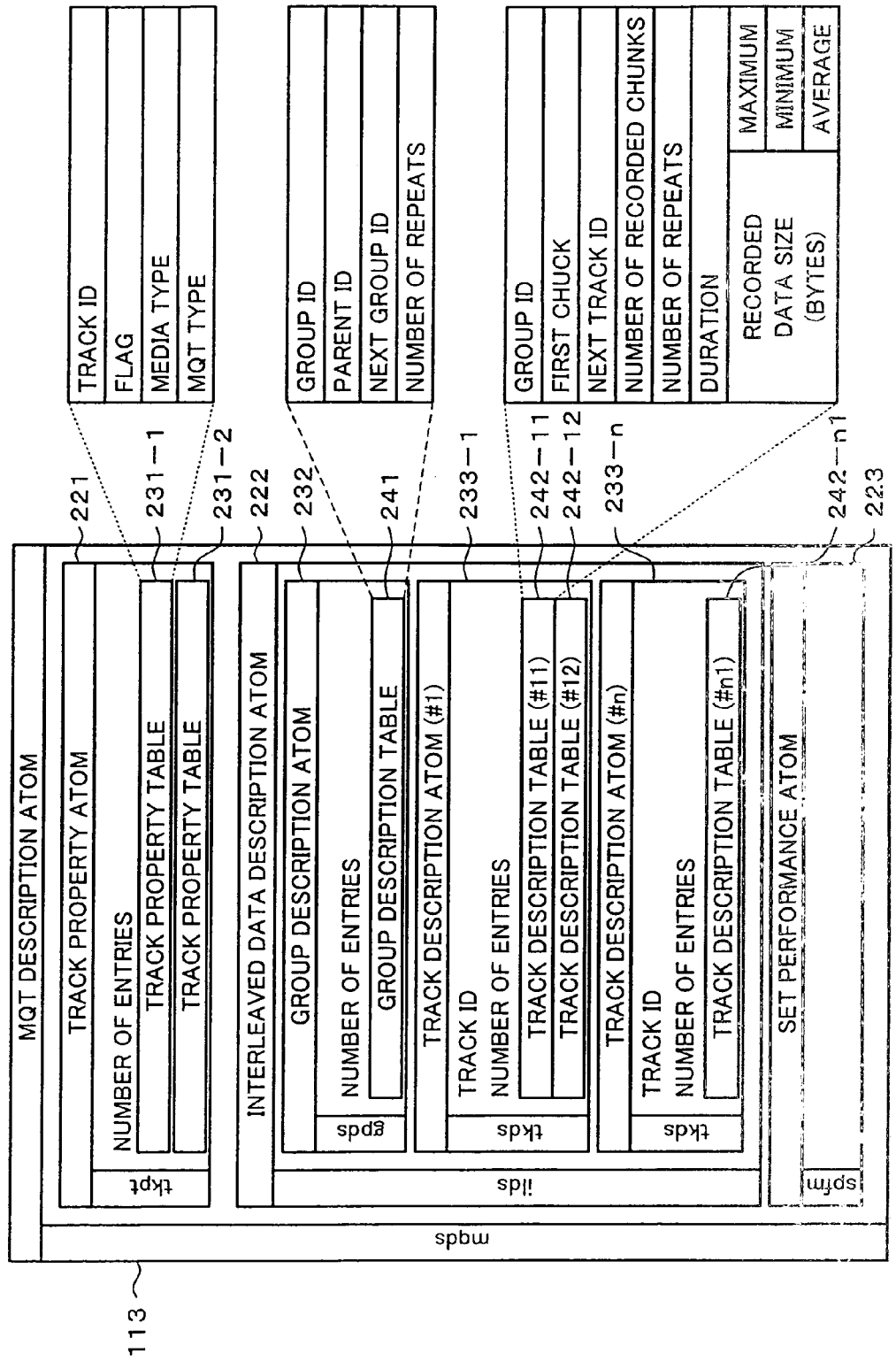
FIG. 14 is a schematic diagram showing the structure of an MQT description atom.

FIG. 14 is a schematic diagram showing the structure of the MQT description atom.

FIG. 15 is a schematic diagram showing an example of the data structure of an IDDA.

FIG. 16 is a schematic diagram showing another example of the data structure of the IDDA.

FIG. 17 is a schematic diagram showing an example of the data structure of a track property atom.

FIG. 15, FIG. 16, and FIG. 17 show coding lists corresponding to a programming language.

In FIG. 14 and FIG. 17, the MQT description atom 113 contains a track property atom (hereinafter abbreviated as TPPA) 221, an IDDA 222, and an STPA 223.

The TPPA 221 contains an NOE and a track property table (hereinafter abbreviated as TPT) 231. The TPT 231 is generated for each track. The TPPA 221 is an atom that describes attribute information for a track. The TPPA 221 has an atom type "tkqt". As with the first embodiment, the NOE is the number of TPTs. The NOE is assigned four bytes.

The TPT 231 contains a track ID, a flag, a media type, and an MQT type.

As with the first embodiment, the track ID is an identification code that the TPPA 221 identifies the corresponding track. The track ID is a track number. The track ID is assigned four bytes.

The flag describes information that identifies the state of the track. The flag is for example Flag 1 that represents whether the track can be used (enabled) or not (disabled). The flag is also Flag 2 that represents whether the MQT description atom can be interpreted or not (QT. non). With the Flag 2, even if a file corresponds to so-called QT, not extended QT according to the present invention, when the MQT description atom is ignored, the media data atom can be reproduced corresponding to the movie atom.

The media type describes information such as video (vide), audio (soun), and text (text) that represent the types of the track.

The MQT type describes information that represents the attribute of the track. The MQT type represents for example original data (orig), reserved area for after-receded data (afrv), chapter (chap), or background music (bgmc). Thus, it can be easily determined whether data has been originally recorded data or after-recorded data. In addition, with chap, an index of still pictures can be created.

Next, with reference to FIG. 18, an example of the TPT 231 will be described.

FIG. 18 is a schematic diagram showing an example of the TPT.

In FIG. 18, for track 1, the TPT describes Flag 1=enabled, Flag 2=QT, Media Type=vide and MQT Type=orig. Thus, track 1 is a valid video track. In other words, track 1 is originally recorded main video data represented by the so-called QT (not extended QT according to the present invention).

For track 2, the TPT describes Flag 1=enabled, Flag 2=QT, Media Type=soun, and MQT Type=orig. Thus, track 2 is a valid audio track. In other words, track 2 is originally recorded main audio data represented by the so-called QT.

For track 3, the TPT describes Flag 1=disabled, Flag 2=non, Media Type=soun, and MQT Type=afrv. Thus, track 3 is an audio track that is invalid by the so-called QT. In other words, track 3 is a reserved area that can be after-recorded and represented by the extended QT according to the present invention.

For track 4, the TPT describes Flag 1=disabled, Flag 2=non, Media Type=soun, and MQT Type=afrv. Thus, track 4 is a video track that is invalid by the so-called QT. In other words, track 4 is still picture data for a main video index that can be represented by the extended QT according to the present invention.

For track 5, the TPT describes Flag 1=disabled, Flag 2=non, Media Type=soun, and MQT Type=afrv. Thus, track 5 is a text track that is invalid by the so-called QT. However, track 5 is text data for a main video index that can be represented by the so-called QT.

For track 6, the TPT describes Flag 1=enabled, Flag 2=QT, Media Type=soun, and MQT Type=bgmc. Thus, track 6 is a valid audio track. In other words, track 6 is a sub audio BGM that can be represented by the so-called QT and that has been after-recorded.

In such a manner, the TPT 231 can describe a QT movie file format or an application dependent file format along with attributes of the individual tracks.

According to the present invention, since the TPPA 221 can totally manage information contained in tracks, the media structure of the entire file can be managed by one atom without need to collect information from the individual tracks. In addition, since the description of the TPPA 221 is independent from the description of the physical structure, when necessary, the selection for recording the TPPA 221 on the record medium 40 can be independently performed.

The IDDA 222 is an atom of which the function of the IDDA 201 is extended. The IDDA 222 contains a group description atom (hereinafter abbreviated as GDCA) 232 and a track description atom (hereinafter abbreviated as TDCA) 233. The IDDA 222 has an atom type "ilds".

The GDCA 232 contains an NOE and a group description table (hereinafter abbreviated as GDT) 241. Whenever the group pattern is changed, the GDT 241 is generated. The GDCA 232 has an atom type "gpds".

The GDT 241 contains group ID, parent ID, next group ID, and number of repeats.

The group ID is an identification code with which the IDDA 222 identifies the corresponding group. The group ID is represented by a number assigned to the group. The group ID is assigned two bytes.

The parent ID is an identification code that represents a higher hierarchical group to which the current group belongs. The parent ID is a number assigned to the higher hierarchical group. The parent ID is assigned two bytes. With the parent ID, the correlation of tracks can be flexibly represented. In other words, when the correlation of tracks is changed, by changing the higher hierarchical group to which the current group belongs, the correlation of new tracks can be represented.

The next group ID is an identification code that represents a group successively recorded after a particular group on the record medium 40. The next group ID also represents a connection of groups in a time series in the successive record length. According to the second embodiment, the next group ID is represented by a group ID and assigned two bytes.

The number of repeats contained in the GDT 241 represents the number of times of which a combination of tracks for a designated group has been repeated and successively recorded on the record medium 40. The number of repeats is assigned one byte.

The TDCA 233 contains a track ID, an NOE, and a track description table (hereinafter abbreviated as TDT) 242.

The TDT 242 is a table of which the function of the IDDT 211 according to the first embodiment is extended. The TDT 242 contains group ID, first chunk, next track ID, number of recorded chunks, number of repeats, duration, and recorded data size. In other words, the TDT 242 also contains group ID as well as all fields of the IDDT 211 according to the first embodiment. Whenever the recorded pattern is changed, the TDT 242 is generated.

The group ID is an identification code that represents a group to which the current track belongs. According to the second embodiment, the group ID is represented by a number assigned to the group. The group ID is assigned two bytes.

Since the first chunk, the next track ID, the number of recorded chunks, the number of repeats, the duration, and the recorded data size contained in the TDT 242 are the same as those contained in the IDDT 211 according to the first embodiment, their description will be omitted.

FIG. 15 shows the case that the group ID is described in the TDT 242. When each track belongs to the same group, as shown in FIG. 16, the group ID may be described in a field of the TDCA 233. FIGS. 15 and 16 show coding lists corresponding to a programming language.

The STPA 202 according to the second embodiment is the same as that according to the first embodiment. The STPA 202 contains a seek time of two bytes and a playback rate (bps) of two bytes.

In the forgoing description, bytes assigned are represented with real practical values. However, it should be noted that the present invention is not limited to such values. Instead, bytes are assigned corresponding to values of individual fields.

In such a manner, the MQT description atom 113 contains information that represents what chunks of what tracks are successively recorded as a set on the record medium 40 in what order and in what unit. In addition, the MQT description atom 113 also contains information that represents in what order groups having tracks that are arranged in the same sequence are successively recorded as a set on the record medium 40 in what unit. In other words, according to the second embodiment of the present invention, management information for data contained in the successive record length and information that depends on a recording apparatus such as a drive are collectively contained in the MQT description atom 113. In addition, information that represents the correlation of tracks is contained in the MQT description atom 113. When a pattern such as the sequence of tracks in a group is changed, by adding the GDT 241, the changed pattern can be flexibly handled. When real data recorded on the record medium 40 is edited, by adding the GDT 241 and the TDT 242 corresponding to the data structure of data that has been edited to the MQT description atom 113, the correlation of tracks can be flexibly changed.

When the recording and reproducing apparatus reproduces a QuickTime movie file, it references the MQT description atom 113, determines tracks to be synchronously reproduced, and reproduces data therefrom.

Next, with information contained in the MQT description atom 113, a process for interpreting a data structure of data successively recorded on the record medium 40 will be described with more practical examples. The process is performed by the digital recording and reproducing apparatus.

Fifth Example

FIG. 19 is a schematic diagram showing a group description table, a track description table, and data successively recorded on a record medium according to a fifth example of the present invention. FIG. 19A shows the group description table. FIG. 19B shows the track description table. FIG. 19C shows the data successively recorded on the record medium.

In FIG. 19B, a TDT 242 contains the following values for audio track 1.
  Group ID=1
  First chunk=1
  Next track ID=2
  Number of recorded chunks=2
  Number of repeats=2
  Duration=n
  Maximum recorded data size=a
  Minimum recorded data size=a
  Average recorded data size=a The TDT 242 contains the following values for video track 2.
  Group ID=1
  First chunk=1
  Next track ID=0
  Number of recorded chunks=1
  Number of repeats=2
  Duration=n
  Maximum recorded data size=b
  Minimum recorded data size=b
  Average recorded data size=b The TDT 242 contains the following values for audio track 3.
  Group ID=2
  First chunk=1
  Next track ID=0
  Number of recorded chunks=4
  Number of repeats=1
  Duration=2n
  Maximum recorded data size=c
  Minimum recorded data size=c
  Average recorded data size=c In FIG. 19A, a first table of a GDT 241 contains the following values.
  Group ID=1
  Parent ID=0
  Next group ID=0
  Number of repeats=2

A second table of the TDT 242 contains the following values.
  Group ID=2
  Parent ID=0
  Next group ID=1
  Number of repeats=2

When an MQT description atom 113 contains the forgoing values, the system controlling microcomputer 19 of the digital recording and reproducing apparatus determines the data structure of data successively recorded on the record medium 40 in the following manner.

First, since the group ID of the audio track 1 is 1, the system controlling microcomputer 19 determines that the audio track 1 belongs to a first group.

Next, since the first chunk o the audio track 1 is 1, the system controlling microcomputer 19 determines that the beginning chunk of the audio track 1 is chunk #1.

Next, since the next track ID of the audio track 1 is 2, the system controlling microcomputer 19 determines that the audio track 1 is followed by video track #2 whose track number is 2.

Next, since the number of recorded chunks of the audio track 1 is 2, the system controlling microcomputer 19 determines that the audio track 1 contains two successive chunks.

Next, since the number of repeats of the audio track 1 is 2, the system controlling microcomputer 19 determines that the audio track 1 is repeated two times in the same recorded state.

Next, since the duration of the audio track is n (where n is any positive integer), the maximum recorded data size is a (where a is any positive integer), the minimum recorded data size is a, the average recorded data size is a, the system controlling microcomputer 19 determines that the time length of data of the audio track 1 is n and that the data size is a as a fixed value.

Next, likewise, since the group ID of the video track 2 is 1, the system controlling microcomputer 19 determines that the video track 2 belongs to the first group. In addition, for the video track 2, the system controlling microcomputer 19 determines that the first chunk is chunk #1, that the video track 2 of the first group is not followed by any track, that the number of chunks is 1, that the same recorded state is repeated two times, that the time length of data of the video track 2 is n, and that the data size is b as a fixed value.

Next, likewise, since the group ID of the audio track 3 is 2, the system controlling microcomputer 19 determines that the audio track 3 belongs to a second group. In addition, for the audio track 3, the system controlling microcomputer 19 determines that the first chunk is chunk #1, that the audio track 3 of the second group is not followed by any track, that the number of chunks is four, that the same recorded state is repeated one time, that the time length of data of the audio track 3 is 2n, and that the data size is c as a fixed value.

In such a manner, the system controlling microcomputer 19 determines that the first group successively recorded on the record medium 40 is composed of the audio track 1, the video track 2, the audio track 1, and the video track 2 arranged as shown in FIG. 19C. In addition, the system controlling microcomputer 19 determines that the second group is composed of one track of the audio track 3 as shown in FIG. 19C.

Next, the system controlling microcomputer 19 analyzes the relation among groups corresponding to the GDT 241.

Firstly, since the group ID of the table #1 is 1, the system controlling microcomputer 19 determines that the table #1 is information for the first group 1. Next, since the parent ID is 0, the system controlling microcomputer 19 determines that a higher group to which the group 1 belongs is higher group 0.

Next, since the next group ID of the table #1 is 0, the system controlling microcomputer 19 determines that the group 1 is not followed by any group.

Next, since the number of repeats of the group 1 of the table #1 is 2, the system controlling microcomputer 19 determines that the group 1 is repeated two times.

Next, since the group ID of the table #2 is 2, the system controlling microcomputer 19 determines that the table #2 is information for the second group 2. Next, since the parent ID is 0, the system controlling microcomputer 19 determines that a higher group to which the group 2 belongs is the group 0. In other words, the system controlling microcomputer 19 determines that the group 2 is the same group as the group 1 (the group 2 has a correlation with the group 1).

Next, since the next group ID of the group 2 of the table #2 is 1, the system controlling microcomputer 19 determines that the group 2 is followed by the group 1 having the same parent ID as the group 2.

Next, since the number of repeats=2 of the group 2 of the table #2 is 2, the system controlling microcomputer 19 determines that the group 2 is repeated two times.

In such a manner, the system controlling microcomputer 19 determines that the data structure of data successively recorded on the record medium 40 is as shown in FIG. 19C.

Sixth Example

In FIG. 19C, the audio track 3, the audio track 1, the video track 2, the audio track 1, and the video track 2 can be treated as one block. Next, a GDT 241 and a TDT 242 that are used in such a case will be described.

FIG. 20 is a schematic diagram showing a group description table, a track description table, and data successively recorded on a record medium according to a sixth example of the present invention. FIG. 20A shows the group description table. FIG. 20B shows the track description table. FIG. 20C shows the data successively recorded on the record medium. Although the collecting method for a group shown in FIG. 20C is different from that shown in FIG. 19C. However, the sequence of tracks shown in FIG. 20C is the same as that shown in FIG. 19C.

In FIG. 20B, the TDT 242 contains the following values for audio track 1.
    Group ID=1
    First chunk=1
    Next track ID=2
    Number of recorded chunks=2
    Number of repeats=2
    Duration=n
    Maximum recorded data size=a
    Minimum recorded data size=a
    Average recorded data size=a
The TDT 242 contains the following values for video track 2.
    Group ID=1
    First chunk=1
    Next track ID=0
    Number of recorded chunks=1
    Number of repeats=2
    Duration=n
    Maximum recorded data size=b
    Minimum recorded data size=b
    Average recorded data size=b
The TDT 242 contains the following values for audio track 3.
    Group ID=1
    First chunk=1
    Next track ID=1
    Number of recorded chunks=4
    Number of repeats=1
    Duration=2n
    Maximum recorded data size=c
    Minimum recorded data size=c
    Average recorded data size=c
In FIG. 20A, the GDT 241 contains the following values.
    Group ID=1
    Parent ID=0
    Next group ID=0
    Number of repeats=2

Although the sequence of tracks is the same, roles of record areas can be changed depending on how a group is designated. In particular, when a group is changed, roles for record areas can be designated so that an audio track that belongs to one group for original audio data and an audio track that belongs to another group for a reserved area to which data is after-recorded.

Seventh Example

FIG. 21 shows a group description table, a track description table, and data successively recorded on a record medium according to a seventh example of the present invention. FIG. 21A shows the group description table. FIG. 21B shows the track description table. FIG. 21C shows the data successively recorded on the record medium.

In FIG. 21B, a TDT 242 contains the following values for audio track 1.
    Group ID=1
    First chunk=1
    Next track ID=2
    Number of recorded chunks=2
    Number of repeats=2
    Duration=n
    Maximum recorded data size=a
    Minimum recorded data size=a
    Average recorded data size=a The TDT 242 contains the following values for video track 2.
  Group ID=1
  First chunk=1
  Next track ID=0
  Number of recorded chunks=1
  Number of repeats=2
  Duration=n
  Maximum recorded data size=b
  Minimum recorded data size=b
  Average recorded data size=b
The TDT 242 contains the following values for audio track 3.
  Group ID=2
  First chunk=1
  Next track ID=0
  Number of recorded chunks=4
  Number of repeats=1
  Duration=n
  Maximum recorded data size=c
  Minimum recorded data size=c
  Average recorded data size=c
The TDT 242 contains the following values for audio track 4.
  Group ID=3
  First chunk=1
  Next track ID=0
  Number of recorded chunks=4
  Number of repeats=1
  Duration=4n
  Maximum recorded data size=d (where d is any positive integer)
  Minimum recorded data size=d
  Average recorded data size=d
In FIG. 21A, a first table of a GDT 241 contains the following values.
  Group ID=1
  Parent ID=0
  Next group ID=3
  Number of repeats=2
The second table of the GDT 241 contains the following values.
  Group ID=2
  Parent ID=0
  Next group ID=1
  Number of repeats=1
The third table of the GDT 241 contains the following values.
  Group ID=3
  Parent ID=0
  Next group ID=0
  Number of repeats=1

When the MQT description atom 113 contains the forgoing values, like with the example 5, the system controlling microcomputer 19 of the digital recording and reproducing apparatus determines the data structure of data successively recorded on the record medium 40.

In other words, since the group ID of the audio track 1 is 1, the system controlling microcomputer 19 determines that the audio track 1 belongs to the first group 1. Next, for the audio track 1, the system controlling microcomputer 19 determines that the first chunk is chunk #1 and that the audio track 1 of the group 1 is followed by the audio track 2 of the group 1. Next, the system controlling microcomputer 19 determines that there are two chunks for the audio track 1 and that the same recorded state is repeated two times. Next, the system controlling microcomputer 19 determines that the time length of data of the audio track 1 is n and that the data size is a as a fixed value.

In addition, since the group ID of the video track 2 is 1, the system controlling microcomputer 19 determines that the video track 2 belongs to the first group 1. For the video track 2, the system controlling microcomputer 19 determines that the first chunk is chunk #1 and that the video track 2 of the group 1 is not followed by any track. In addition, for the video track 2, the system controlling microcomputer 19 determines that the number of chunks is one and that the same recorded state is repeated two times. In addition, the system controlling microcomputer 19 determines that the time length of data of the video track 2 is n and that the data size is b as a fixed value.

Next, since the group ID of the audio track 3 is 2, the system controlling microcomputer 19 determines that the audio track 3 belongs to the second group 2. For the audio track 3, the system controlling microcomputer 19 determines that the first chunk is chunk #1 and that the audio track 3 of the group 2 is not followed by any track. In addition, for the audio track 3, the system controlling microcomputer 19 determines that the number of chunks is four and that the same recorded state is repeated one time. In addition, the system controlling microcomputer 19 determines that the time length of data of the audio tack 3 is 4n and that the data size is c as a fixed value.

In addition, since the group ID of the audio track 4 is 3, the system controlling microcomputer 19 determines that the audio track 4 belongs to the third group 3. In addition, for the audio track 4, the system controlling microcomputer 19 determines that the first chunk is the chunk #1 and that the audio track 4 of the group 3 is not followed by any track. In addition, the system controlling microcomputer 19 determines that the number of chunks of the audio track 4 is four and that the same recorded state is repeated once time. In addition, the system controlling microcomputer 19 determines that the time length of data of the audio track 4 is 4n and that the data size is d as a fixed value.

In such a manner, the system controlling microcomputer 19 determines that the first group 1 successively recorded on the record medium 40 is composed of the audio track 1, the video track 2, the audio track 1, and the video track 2 arranged as shown in FIG. 21C. In addition, the system controlling microcomputer 19 determines that the second group 2 is composed of one track of the audio track 3 as shown in FIG. 21C. In addition, the system controlling microcomputer 19 determines that the third group 3 is composed of one track of the audio track 4 as shown in FIG. 21C.

Next, the system controlling microcomputer 19 analyzes the relation among groups corresponding to the GDT 241.

Firstly, since the group ID of the table #1 is 1, the system controlling microcomputer 19 determines that the table #1 is information for the first group 1. Next, since the parent ID is 0, the system controlling microcomputer 19 determines that a higher group to which the group 1 belongs is the group 0.

Next, since the next group ID of the group 1 of the table #1 is 3, the system controlling microcomputer 19 determines that the group 1 is followed by the third group 3.

Next, since the number of repeats of the group 1 of the table #1 is 2, the system controlling microcomputer 19 determines that the group 1 is repeated two times.

Next, since the group ID of the table #2 is 2, the system controlling microcomputer 19 determines that the table #2 is information for the second group 2. Next, since the parent ID is 0, the system controlling microcomputer 19 determines that a higher group to which the group 2 belongs is the group 0. In other words, the system controlling microcomputer 19 determines that the group 2 is the same group as the group 1 (the group has a correlation with the group 1).

Next, since the next group ID of the group 2 of the table #2 is 1, the system controlling microcomputer 19 determines that the group 2 is followed by the group 1 that has the same parent ID as the group 2.

Next, since the number of repeats of the group 2 of the table #2 is 2, the system controlling microcomputer 19 determines that the group 2 is repeated one time.

Next, since the group ID of the table #3 is 3, the system controlling microcomputer 19 determines that the table #3 is information for the third group 3. Next, since the parent ID is 0, the system controlling microcomputer 19 determines that a higher group to which the group 3 belongs is the group 0. As a result, the group 1 is the same group as the group 3 that has a correlation therewith.

Next, since the next group ID of the group 3 of the table #3 is 0, the system controlling microcomputer 19 determines that the group 3 is not followed by any group.

Next, since the number of repeats of the group 3 of the table #3 is 1, the system controlling microcomputer 19 determines that the group 3 is repeated one time.

In such a manner, the system controlling microcomputer 19 determines that the data structure of data successively recorded on the record medium 40 is as shown in FIG. 21C.

According to the first embodiment, the case that each track is recorded at the same interval can be easily described. However, it is difficult to deal with the case that each track is not recorded at the same interval as with the audio track 3 and the audio track 4 shown in FIG. 21C. On the other hand, according to the second embodiment, the case that each track is recorded at different intervals unlike with the audio track 3 and the audio track 4 can be easily dealt with the GDCA 232 (GDT 242) and the TDCA 233 (TDT 242) as shown in FIGS. 21A and 21C.

Next, the case that the data structure of a successive record length and the correlation among tracks are changed while data is being recorded or the case that they are edited and changed will be exemplified.

Eighth Example

Figure 22C:
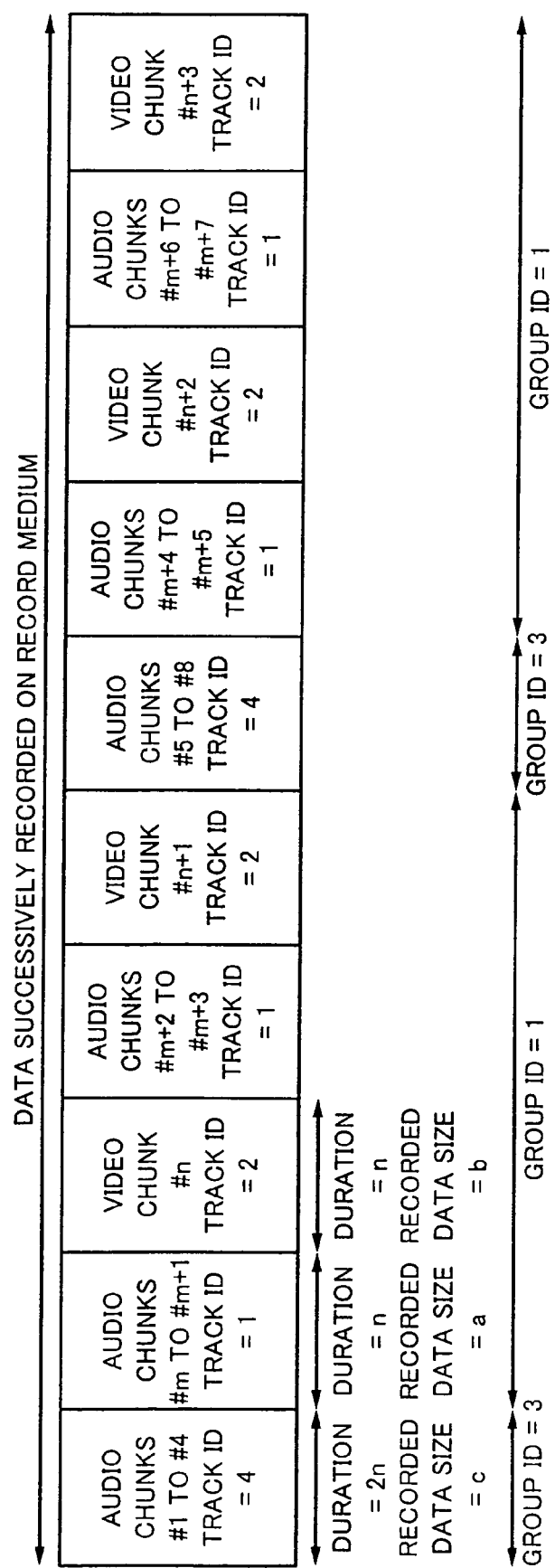
FIG. 22C" is a schematic diagram showing data successively recorded on a record medium according to the eighth example of the present invention.

An eighth example deals with the case that the data structure shown in FIG. 19C is changed to a data structure shown in FIG. 22C. In other words, another track 4 is recorded as a group 3 at the position of group 2. In addition, a combination of the first group 1 and the second group 2 is changed to a combination of the group 1 and the third group 3.

For example, the case that original data that has been recorded on the audio track 1 and the audio track 3 is reproduced along with the video track 2 may be changed to the case that data that has been after-recorded on the audio track 4 is reproduced along with the video track 2. For example, data of some language is recorded on the audio track 1 and data of another language is recorded on the audio track 3.

In such a case, a GDT 241 and a TDT 242 shown in FIG. 22A and FIG. 22B are used, respectively.

As is clear from the comparison of FIG. 19B and FIG. 22B", when the data structure is changed, a table corresponding to the audio track 4 is added to the TDT 242. In addition, when the combination is changed, the table #3 and the table #4 are added to the GDT 241.

In FIG. 22B", the TDT 242 contains the following values for the audio track 4.
Group ID=3
First chunk=1
Next track ID=0
Number of recorded chunks=4
Number of repeats=1
Duration=4n
Maximum recorded data size=d
Minimum recorded data size=d
Average recorded data size=d In FIG. 22A", the third table of the GDT 241 contains the following values.
Group ID=1
Parent ID=1
Next group ID=0
Number of repeats=2

The fourth table of the GDT 241 contains the following values.
Group ID=3
Parent ID=1
Next group ID=1
Number of repeats=2

With these values, since the group ID of the table #3 is 1, the system controlling microcomputer 19 determines that the table #3 is information for the group 1. In addition, since the parent ID is 1, the system controlling microcomputer 19 determines a higher group to which the group 1 belongs is 1. In other words, a higher group to which the group 1 belongs is changed from the group 0 to the group 1.

Next, since the next group ID of the group 1 of the table #3 is 0, the system controlling microcomputer 19 determines that the group 1 is not followed by any group.

Next, since the number of repeats of the group 1 of the table #3 is 2, the system controlling microcomputer 19 determines that the group 1 is repeated two times.

On the other hand, since the group ID of the table #4 is 3, the system controlling microcomputer 19 determines that the table #4 is information for the group 3. In addition, since the parent ID is 1, the system controlling microcomputer 19 determines that a higher group to which the group 3 belongs is group 1. In other words, the system controlling microcomputer 19 determines that the group belongs to the same group as the group 1 and has a correlation with the group 1.

Next, since the next group ID of the group 3 of the table #4 is 1, the system controlling microcomputer 19 determines that the group 3 is followed by the group 1.

Next, since the number of repeats of the group 3 of the table #4 is 2, the system controlling microcomputer 19 determines that the group 3 is repeated two times.

The system controlling microcomputer 19 determines that the data structure of data successively recorded on the record medium 40 has been changed from the data structure shown in FIG. 1C to the data structure shown in FIG. 22C".

The data structure shown in FIG. 7B can be described in the manner according to the first embodiment without need to use a group ID.

Alternatively, with a group ID, a data structure can be described as follows.

Ninth Example

Example 9 shows the case that the data structure shown in FIG. 7B is described using a group ID.

Figures 23C, 23D:
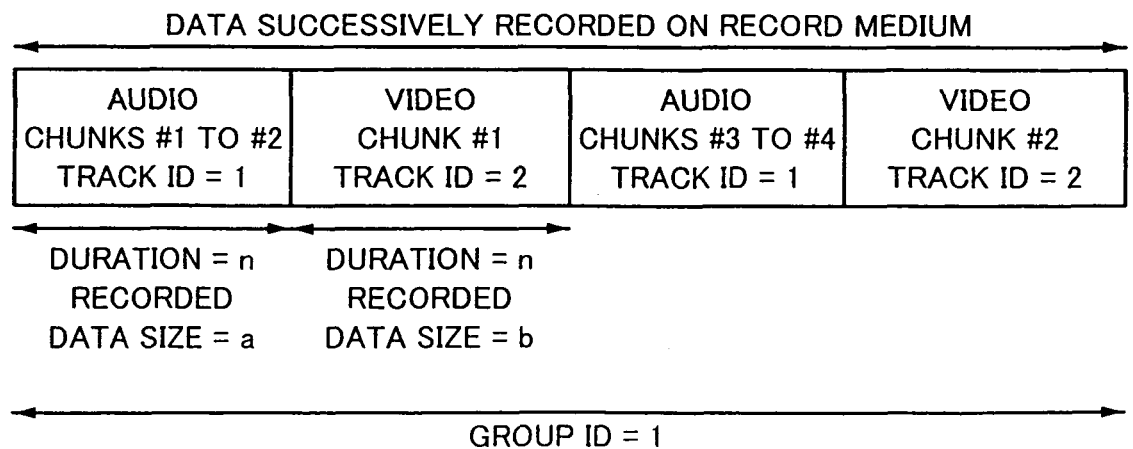
FIG. 23C is a schematic diagram showing a track description table for video tracks according to the ninth example of the present invention.
FIG. 23D is a schematic diagram showing data successively recorded on a record medium according to the ninth example of the present invention.

FIG. 23 shows a group description table, track description tables, and data successively recorded on a record medium according to the ninth example of the present invention. FIG. 23A shows the group description table. FIG. 23B shows the track description table for an audio track. FIG. 23C shows the track description table for a video track. FIG. 23D shows data successively recorded on the record medium (namely, data shown in FIG. 7B).

When a data structure is described as shown in FIG. 23D (FIG. 7B) using a group ID, a TDT 242 contains the following values for the audio track as shown in FIG. 23B.
Group ID=1
First chunk=1
Next track ID=2

Number of recorded chunks=2
Number of repeats=2
Duration=n
Maximum recorded data size=a
Minimum recorded data size=a
Average recorded data size=a As shown in FIG. 23C, the TDT 242 contains the following values for the video track.
Group ID=1
First chunk=1
Next track ID=0
Number of recorded chunks=1
Number of repeats=2
Duration=n
Maximum recorded data size=b
Minimum recorded data size=b
Average recorded data size=b In FIG. 23A, a GDT 241 contains the following values.
Group ID=1
Parent ID=0
Next group ID=0
Number of repeats=1

Tenth Example

On the other hand, when the data structure is changed to the data structure shown in FIG. 10B" and to the data structure shown in FIG. 10C", tables are described as shown in FIG. 24 and FIG. 25.

Figures 24C, 24D:
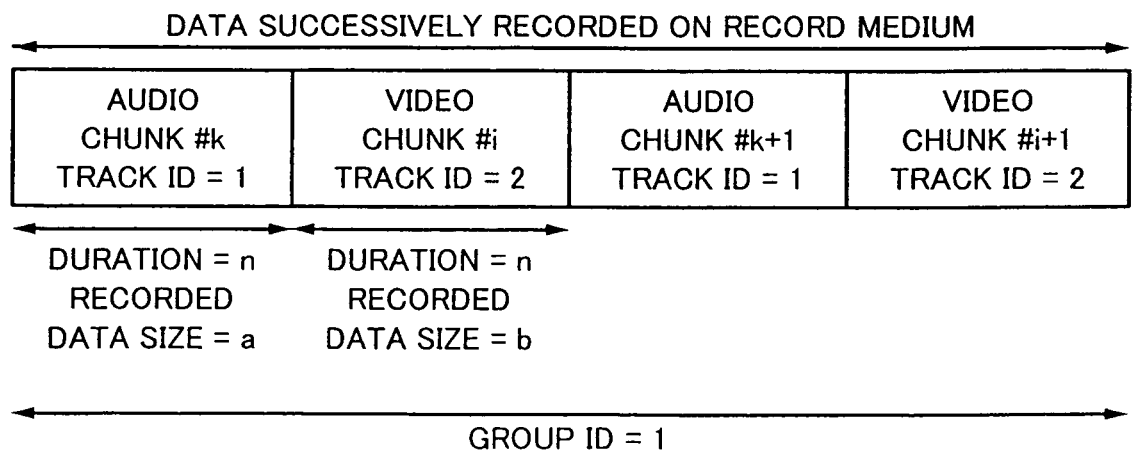
FIG. 24C' is a schematic diagram showing a track description table for video tracks according to the tenth example of the present invention.
FIG. 24D' is a schematic diagram showing data successively recorded on a record medium according to the tenth example of the present invention.

FIG. 24 and FIG. 25 show group description tables, track description tables, and data successively recorded on a record medium according to the tenth example of the present invention. FIG. 24A' and FIG. 25A" show the group description tables. FIG. 24B' and FIG. 25B" show the track description tables for an audio track. FIG. 24C and FIG. 25C" show the track description tables for a video track. FIG. 24D' and FIG. 25D" show the data successively recorded on the record medium. The data shown in FIG. 24D" is the same as that shown in FIG. 10B". The data shown in FIG. 25D" is the same as that shown in FIG. 10C".

When the data shown in FIG. 10A" (FIG. 23D) is changed to that shown in FIG. 10B" (FIG. 24D'), as is clear from the comparison of FIG. 23 and FIG. 24, the chunk size is changed from two chunks to one chunk. A table #2 is added to the TDT 242 for the audio track. The table #2 added to the TDT 242 contains the following values.
Group ID=1
First chunk=k
Next track ID=2
Number of recorded chunks=1
Number of repeats=2
Duration=n
Maximum recorded data size=a
Minimum recorded data size=a
Average recorded data size=a When the data shown in FIG. 10B" (FIG. 24D') is changed to that shown in FIG. 10C" (FIG. 25D"), as is clear from the comparison of FIG. 24 and FIG. 25, the duration and the record of size of each track are changed. Correspondingly, a table for the second group 2 is added to the GDT 241. In addition, tables are added to the TDTs 242 for the audio track and video track. The table added to the GDT 241 contains the following values.
Group ID=2
Parent ID=1
Next group ID=0
Number of repeats=1

The table #3 added to the TDT 242 for the audio track contains the following values.
Group ID=2
First chunk=m
Next track ID=0
Number of recorded chunks=2
Number of repeats=1
Duration=2n
Maximum recorded data size=2a
Minimum recorded data size=2a
Average recorded data size=2a The table #2 added to the TDT 242 for the video track contains the following values.
Group ID=2
First chunk=j
Next track ID=1
Number of recorded chunks=2
Number of repeats=1
Duration=2n
Maximum recorded data size=2b
Minimum recorded data size=2b
Average recorded data size=2b Each example of the first embodiment can be described using a group ID.

According to the present invention, the relation among of data pieces recorded on a record medium can be easily and quickly obtained. Thus, a record unit of data recorded on a record medium can be changed while the data is being recorded. In addition, data can be edited so that it can be successively reproduced after it is recorded.

The invention claimed is:

1. A recording apparatus for recording data to a rewritable record medium, comprising:
   encoding means for encoding the data corresponding to a predetermined compressing and encoding system;
   converting means for converting a data structure of encoded data that is output from the encoding means into a file structure that a computer software program that synchronously reproduces a moving picture and so forth can handle without need to use a special hardware device; and
   recording means for recording data having the file structure to the record medium,
   wherein the file structure has (a) a first data unit of data, (b) a second data unit being a set of a plurality of first data units successively recorded, and (c) a data portion describing management information for each track of the record medium,
   wherein a plurality of second data units is correlated with a successive record length of the record medium and a part of each second data unit is pre-allocated as a reserve area, the reserve area recorded after original data is recorded wherein post-recorded data in the reserve area is reproduced in synchronization with pre-recorded data in the successive record length of each second data unit, and
   wherein the data portion contains (a) information representing a data type of the first data unit, (b) information representing a record sequence of the plurality of first data units, (c) information representing a number of successive first data units for each data type recorded on a designated track, (d) information representing a number of times of which successive first data units are repeatedly recorded on a track for each data type, and (e) information identifying a beginning first data unit corresponding to the second data unit recorded in the successive record length.

2. The recording apparatus as set forth in claim 1, wherein the data length is at least one of the maximum value, the minimum value, and the average value of the plurality of second data units recorded on the record medium.

3. The recording apparatus as set forth in claim 1, wherein the file structure has a hierarchy, the data portion being placed in any hierarchical level other than the lowest hierarchical level.

4. The recording apparatus as set forth in claim 1, wherein the file structure has a hierarchy, the data portion being placed in the highest hierarchical level.

5. The recording apparatus as set forth in claim 1, wherein the data portion further contains a read time necessary for reading the data from the record medium.

6. The recording apparatus as set forth in claim 5, wherein the read time is a seek time and a playback rate.

7. The recording apparatus as set forth in claim 1, wherein the data portion contains information representing the reserved area.

8. A non-transitory computer readable record medium on which a plurality of pieces of data is recorded as (a) a first data unit of data, (b) a second data unit being a set of a plurality of first data units successively recorded, and (c) a data portion describing management information for managing the plurality of pieces of data for each track of record medium, wherein the plurality of second data units is correlatively recorded to a successive record length of the record medium, and a part of each second data unit is pre-allocated as a reserve area, the reserve area recorded after original data is recorded wherein post-recorded data in the reserve area is reproduced in synchronization with pre-recorded data in the successive record length of each second data unit and wherein the data portion contains (a) information representing a data type of the first data unit, (b) information, representing a record sequence of the plurality of first data units, (c) information representing a number of successive first data units for each data type recorded on a designated track, (d) information representing a number of times of which successive first data units are repeatedly recorded on a track for each data type, and (e) information identifying a beginning first data unit corresponding to the second data unit recorded in the successive record length.

* * * * *